(12) United States Patent
Gao et al.

(10) Patent No.: US 12,136,808 B2
(45) Date of Patent: Nov. 5, 2024

(54) PHOTOVOLTAIC POWER GENERATION SYSTEM AND METHOD

(71) Applicant: Huawei Digital Power Technologies Co., Ltd., Shenzhen (CN)

(72) Inventors: Yongbing Gao, Shanghai (CN); Chen Wang, Shanghai (CN); Tiansan Lin, Shanghai (CN); Yang Hu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/701,940

(22) Filed: Mar. 23, 2022

(65) Prior Publication Data

US 2022/0216690 A1 Jul. 7, 2022

Related U.S. Application Data

(63) Continuation of application No. PCT/CN2020/090227, filed on May 14, 2020.

(30) Foreign Application Priority Data

Sep. 24, 2019 (CN) .......................... 201910905938.0

(51) Int. Cl.
*H02H 7/00* (2006.01)
*H02H 1/00* (2006.01)
(Continued)

(52) U.S. Cl.
CPC ............ *H02H 7/20* (2013.01); *H02H 1/0007* (2013.01); *H02J 3/381* (2013.01); *H02J 2300/22* (2020.01); *H02J 2300/24* (2020.01)

(58) Field of Classification Search
None
See application file for complete search history.

(56) References Cited

U.S. PATENT DOCUMENTS

2009/0287430 A1 11/2009 Atoji et al.
2010/0008107 A1* 1/2010 Mallwitz ........... H02M 3/33576
363/21.02

(Continued)

FOREIGN PATENT DOCUMENTS

CN 103229063 A 7/2013
CN 203117365 U 8/2013
(Continued)

*Primary Examiner* — Stephen W Jackson
(74) *Attorney, Agent, or Firm* — Maier & Maier, PLLC

(57) ABSTRACT

A photovoltaic power generation system includes an inverter, a controller, and at least two direct current branch circuits. The leakage current detection apparatus is configured to: detect a leakage current of the direct current branch circuit on which the leakage current detection apparatus is located and send the leakage current to the controller. The controller is further configured to: when the photovoltaic power generation system runs and a value of a leakage current of the direct current branch circuit exceeds a preset range, determine that an insulation fault occurs on the direct current branch circuit. The system can determine the direct current branch circuit on which the insulation fault occurs in the photovoltaic power generation system, so that measures are taken in time for the direct current branch circuit on which the insulation fault occurs, to eliminate a potential safety hazard.

17 Claims, 10 Drawing Sheets

(51) Int. Cl.
*H02H 7/20* (2006.01)
*H02J 3/38* (2006.01)

(56) References Cited

U.S. PATENT DOCUMENTS

| | | | |
|---|---|---|---|
| 2011/0199707 A1 | 8/2011 | Kazemi et al. | |
| 2012/0262952 A1* | 10/2012 | Rigbers | H02M 3/33571 363/16 |
| 2014/0239968 A1 | 8/2014 | Ishii | |
| 2015/0171766 A1* | 6/2015 | Valiani | H02M 7/487 307/82 |

FOREIGN PATENT DOCUMENTS

| | | | |
|---|---|---|---|
| CN | 103475271 A | 12/2013 | |
| CN | 103558496 A | 2/2014 | |
| CN | 103901315 A | 7/2014 | |
| CN | 104137268 A | 11/2014 | |
| CN | 203929889 U | 11/2014 | |
| CN | 103048544 B | 3/2015 | |
| CN | 105141254 A | 12/2015 | |
| CN | 205353281 U | 6/2016 | |
| CN | 205792453 U | 12/2016 | |
| CN | 106602507 A | 4/2017 | |
| CN | 107305224 A | 10/2017 | |
| CN | 107968627 A | 4/2018 | |
| CN | 105606897 B | 2/2019 | |
| EP | 2648009 A1 | 10/2013 | |
| EP | 2750258 A2 | 7/2014 | |
| EP | 3264550 A1 | 1/2018 | |
| JP | 2001169561 A | 6/2001 | |
| KR | 101248592 B1 | 4/2013 | |

\* cited by examiner

PHOTOVOLTAIC POWER GENERATION SYSTEM AND METHOD

CROSS-REFERENCE TO RELATED APPLICATIONS

This application is a continuation of International Application No. PCT/CN2020/090227, filed on May 14, 2020, which claims priority to Chinese Patent Application No. 201910905938.0, filed on Sep. 24, 2019. The disclosures of the aforementioned applications are hereby incorporated by reference in their entireties.

TECHNICAL FIELD

The embodiments relate to the field of photovoltaic power generation technologies, and in particular, to a photovoltaic power generation system and a method.

BACKGROUND

Photovoltaic power generation is a technology that uses a photovoltaic effect of a semiconductor interface to convert light energy into electric energy. A photovoltaic power generation system usually includes devices such as a photovoltaic unit, a power converter, and an inverter.

As an input capacity configuration of the photovoltaic power generation system is increasingly high, an electric energy yield is usually expanded in a multi-channel MPPT (Maximum Power Point Tracking) manner, that is, an input end of an inverter includes a plurality of direct current branch circuits, and each direct current branch circuit includes a photovoltaic unit and a power converter.

For a photovoltaic power generation system that includes a plurality of direct current branch circuits, an insulation fault on a direct current branch circuit causes a potential safety hazard for running of the photovoltaic power generation system and contact with human or livestock. Therefore, insulation fault detection needs to be performed on the photovoltaic power generation system. It may be determined, by detecting a value of an overall insulation resistance to ground of the photovoltaic power generation system, whether an insulation fault occurs in the photovoltaic power generation system. However, when it is determined that an insulation fault occurs in the photovoltaic power generation system, a direct current branch circuit on which the insulation fault occurs cannot be positioned, and therefore the fault cannot be isolated before the photovoltaic power generation system runs or when the photovoltaic power generation system runs.

SUMMARY

To resolve the foregoing problem, embodiments include a photovoltaic power generation system and a method determine a direct current branch circuit on which an insulation fault occurs in the photovoltaic power generation system, so that measures are taken in time for the direct current branch circuit on which the insulation fault occurs, to eliminate a potential safety hazard.

According to a first aspect, a photovoltaic power generation system includes an inverter, a controller, and at least two direct current branch circuits. Each direct current branch circuit includes a DC-DC converter and a leakage current detection apparatus. An input end of the DC-DC converter is connected to a corresponding photovoltaic unit, and an output end of the DC-DC converter is connected to an input end of the inverter. The DC-DC converter is configured to: perform DC-DC conversion on a direct current that is output by the corresponding photovoltaic unit, and then transmit a converted direct current to the inverter. The inverter is configured to invert the direct current transmitted by the DC-DC converter into an alternating current. The leakage current detection apparatus is configured to: detect a leakage current of the direct current branch circuit on which the leakage current detection apparatus is located, and send the leakage current to the controller. The controller is configured to: before the photovoltaic power generation system runs, determine, based on values and directions of leakage currents of the direct current branch circuits, a direct current branch circuit on which an insulation fault occurs. The controller is further configured to: when the photovoltaic power generation system runs, when a value of a leakage current of the direct current branch circuit exceeds a preset range, determine that an insulation fault occurs on the direct current branch circuit.

When an insulation fault occurs in the photovoltaic power generation system before the photovoltaic power generation system runs, a leakage current of a normal direct current branch circuit flows to a direct current branch circuit on which the insulation fault occurs. Therefore, a value of a leakage current of the direct current branch circuit on which the insulation fault occurs is a sum of values of leakage currents of all normal direct current branch circuits, and a direction of the leakage current of the direct current branch circuit on which the insulation fault occurs is opposite to directions of the leakage currents of all the normal direct current branch circuits. Therefore, the controller can determine, based on the values and the directions of the leakage currents of the direct current branch circuits, the direct current branch circuit on which the insulation fault occurs. When an insulation fault occurs in the photovoltaic power generation system when the photovoltaic power generation system runs, a value of a leakage current of a direct current branch circuit on which the insulation fault occurs significantly increases. Therefore, when the value of the leakage current of the direct current branch circuit exceeds the preset range, the controller can determine that the insulation fault occurs on the direct current branch circuit, so that measures are taken in time for the direct current branch circuit on which the insulation fault occurs, to eliminate a potential safety hazard.

With reference to the first aspect, in a first possible implementation, the photovoltaic power generation system further includes an insulation resistance detection apparatus. The insulation resistance detection apparatus is configured to: before the photovoltaic power generation system runs, detect a value of an insulation resistance to ground of the photovoltaic power generation system, and send the value of the insulation resistance to ground to the controller. The controller is configured to: when the value of the insulation resistance to ground is less than a preset resistance range, determine that an insulation fault occurs in the photovoltaic power generation system.

When the insulation resistance detection apparatus determines that the insulation fault occurs in the photovoltaic power generation system, leakage current detection apparatuses may be used to detect leakage currents of the direct current branch circuits, and send the leakage currents to the controller, so that the controller determines, based on values and directions of the leakage currents of the direct current branch circuits, a direct current branch circuit on which the insulation fault occurs. When it is determined that no insulation fault occurs in the photovoltaic power generation system, the leakage current detection apparatuses do not need to detect leakage currents of the direct current branch circuits. Therefore, insulation resistance detection efficiency can be improved.

With reference to any one of the first aspect or the foregoing implementation, in a second possible implementation, each direct current branch circuit further includes an input voltage detection apparatus. The input voltage detection apparatus is configured to detect a voltage to ground of the input end of the DC-DC converter of the corresponding direct current branch circuit. The controller is further configured to: when the voltage to ground of the input end of the DC-DC converter is less than a preset input voltage range, determine that an insulation fault occurs on the corresponding direct current branch circuit.

The input voltage detection apparatus is added to the input end of the DC-DC converter, so that the controller determines, based on a detection result of the input voltage detection apparatus, a direct current branch circuit on which an insulation fault occurs, or may perform comparison verification on the obtained determining conclusion and the determining conclusion obtained by using the leakage current of the direct current branch circuit, to further improve insulation fault detection accuracy.

With reference to any one of the first aspect or the foregoing implementations, in a third possible implementation, each direct current branch circuit further includes an output voltage detection apparatus. The output voltage detection apparatus is configured to detect a voltage to ground of the output end of the DC-DC converter of the corresponding direct current branch circuit. The controller is configured to: when the voltage to ground of the output end of the DC-DC converter is less than a preset output voltage range, determine that an insulation fault occurs on the corresponding direct current branch circuit.

The output voltage detection apparatus is added to the output end of the DC-DC converter, so that the controller determines, based on a detection result of the output voltage detection apparatus, a direct current branch circuit on which an insulation fault occurs, or may perform comparison verification on the obtained determining conclusion and the determining conclusion obtained by using the leakage current of the direct current branch circuit, to further improve insulation fault detection accuracy.

With reference to any one of the first aspect or the foregoing implementations, in a fourth possible implementation, each direct current branch circuit further includes a breaking apparatus. The controller is further configured to: when determining that an insulation fault occurs on the direct current branch circuit, control the breaking apparatus on the direct current branch circuit on which the insulation fault occurs to be disconnected, to fast isolate the insulation fault.

With reference to any one of the first aspect or the foregoing implementations, in a fifth possible implementation, the controller is further configured to: after controlling the breaking apparatus on the direct current branch circuit on which the insulation fault occurs to be disconnected, control the DC-DC converter on the direct current branch circuit on which the insulation fault occurs to be powered off, to protect the corresponding direct current branch circuit, thereby facilitating fault maintenance.

With reference to any one of the first aspect or the foregoing implementations, in a sixth possible implementation, the breaking apparatus of each direct current branch circuit is integrated into the DC-DC converter, or the breaking apparatus of each direct current branch circuit is integrated into the inverter. A disposition position of the breaking apparatus may be determined based on an actual case. This is not limited.

With reference to any one of the first aspect or the foregoing implementations, in a seventh possible implementation, the leakage current detection apparatus of each direct current branch circuit is integrated into the corresponding DC-DC converter, or the leakage current detection apparatus of each direct current branch circuit is integrated into the inverter. A disposition position of the leakage current detection apparatus may be determined based on an actual case. This is not limited.

According to a second aspect, a photovoltaic power generation system includes an insulation resistance detection apparatus, an inverter, a controller, and at least two direct current branch circuits. Each direct current branch circuit includes a DC-DC converter and a breaking apparatus. An input end of the DC-DC converter is connected to a corresponding photovoltaic unit, and an output end of the DC-DC converter is connected to an input end of the inverter. The DC-DC converter is configured to: perform direct current-direct current conversion on a direct current that is output by the corresponding photovoltaic unit, and then transmit a converted direct current to the inverter. The inverter is configured to invert the direct current transmitted by the DC-DC converter into an alternating current. The insulation resistance detection apparatus is configured to: before the photovoltaic power generation system runs, detect a value of an insulation resistance to ground of the photovoltaic power generation system, and send the value of the insulation resistance to ground to the controller. The controller is configured to: when the value of the insulation resistance to ground is less than a preset resistance range, determine that an insulation fault occurs in the photovoltaic power generation system, and sequentially control breaking apparatuses on the direct current branch circuits to be disconnected, to determine a direct current branch circuit on which the insulation fault occurs.

Before the photovoltaic power generation system runs, the value of the insulation resistance to ground of the photovoltaic power generation system is detected by using the insulation resistance detection apparatus, so that it can be first determined whether an insulation fault occurs in the entire photovoltaic power generation system. When determining that an insulation fault occurs in the photovoltaic power generation system, the controller can sequentially control the breaking apparatuses on the direct current branch circuits to be disconnected, to determine a direct current branch circuit on which the insulation fault occurs, so that insulation fault isolation can be performed in time on the direct current branch circuit on which the insulation fault occurs, to eliminate a potential safety hazard.

According to a third aspect, a method diagnoses an insulation fault of a photovoltaic power generation system. The photovoltaic power generation system includes an inverter and at least two direct current branch circuits. Each direct current branch circuit includes a DC-DC converter and a leakage current detection apparatus. An input end of the DC-DC converter is connected to a corresponding photovoltaic unit, and an output end of the DC-DC converter is connected to an input end of the inverter. The method includes: controlling the DC-DC converter to perform direct current-direct current conversion on a direct current that is output by the corresponding photovoltaic unit, and then transmit a converted direct current to the inverter, controlling the inverter to invert the direct current transmitted by the DC-DC converter into an alternating current, and receiving a leakage current that is of the direct current branch circuit on which the leakage current detection apparatus is located and that is detected by the leakage current detection apparatus; before the photovoltaic power generation system runs, determining, based on values and directions of leakage currents of the direct current branch circuits, a direct current branch circuit on which an insulation fault occurs; and when the photovoltaic power generation system runs, when a value of a leakage current of the direct current branch circuit exceeds a preset range, determining that an insulation fault occurs on the direct current branch circuit.

According to the method, before the photovoltaic power generation system runs, the direct current branch circuit on which the insulation fault occurs can be determined based on the values and the directions of the leakage currents of the direct current branch circuits; and further, when the photovoltaic power generation system runs, when the value of the leakage current of the direct current branch circuit exceeds the preset range, it can be determined that the insulation fault occurs on the direct current branch circuit. Therefore, according to the method, a direct current branch circuit on which an insulation fault occurs can be determined before the photovoltaic power generation system runs or when the photovoltaic power generation system runs, so that the direct current branch circuit on which the insulation fault occurs can be controlled in time to stop working to isolate the insulation fault, to eliminate a potential safety hazard.

With reference to the third aspect, in a first possible implementation, before the determining, based on values and directions of leakage currents of the direct current branch circuits, a direct current branch circuit on which an insulation fault occurs, the method further includes: obtaining a value of an insulation resistance to ground of the photovoltaic power generation system; and when the value of the insulation resistance to ground is less than a preset resistance range, determining that the insulation fault occurs in the photovoltaic power generation system.

When it is determined that the insulation fault occurs in the photovoltaic power generation system, leakage current detection apparatuses may be used to detect leakage currents of the direct current branch circuits, and send the leakage currents to a controller, so that the controller determines, based on values and directions of the leakage currents of the direct current branch circuits, a direct current branch circuit on which the insulation fault occurs. When it is determined that no insulation fault occurs in the photovoltaic power generation system, the leakage current detection apparatuses may be controlled to no longer detect leakage currents of the direct current branch circuits. Therefore, insulation resistance detection efficiency can be improved.

With reference to any one of the third aspect or the foregoing implementation, in a second possible implementation, the method further includes: obtaining a voltage to ground of the input end of the DC-DC converter of the corresponding direct current branch circuit; and when the voltage to ground of the input end of the DC-DC converter is less than a preset input voltage range, determining that an insulation fault occurs on the corresponding direct current branch circuit.

The controller may determine, based on a detection result of an input voltage detection apparatus, a direct current branch circuit on which an insulation fault occurs, or may perform comparison verification on the obtained determining conclusion and the determining conclusion obtained by using the leakage current of the direct current branch circuit, to further improve insulation fault detection accuracy.

With reference to any one of the third aspect or the foregoing implementations, in a third possible implementation, the method further includes: obtaining a voltage to ground of the output end of the DC-DC converter of the corresponding direct current branch circuit; and when the voltage to ground of the output end of the DC-DC converter is less than a preset output voltage range, determining that an insulation fault occurs on the corresponding direct current branch circuit.

The controller may determine, based on a detection result of an output voltage detection apparatus, a direct current branch circuit on which an insulation fault occurs, or may perform comparison verification on the obtained determining conclusion and the determining conclusion obtained by using the leakage current of the direct current branch circuit, to further improve insulation fault detection accuracy.

With reference to any one of the third aspect and the foregoing implementations, in a fourth possible implementation, each direct current branch circuit includes a breaking apparatus; and the method further includes: when determining that an insulation fault occurs on the direct current branch circuit, controlling the breaking apparatus on the direct current branch circuit on which the insulation fault occurs to be disconnected, to effectively isolate the insulation fault.

With reference to any one of the third aspect and the foregoing implementations, in a fifth possible implementation, the method further includes: after controlling the breaking apparatus on the direct current branch circuit on which the insulation fault occurs to be disconnected, controlling the DC-DC converter on the direct current branch circuit on which the insulation fault occurs to be powered off, to protect the corresponding direct current branch circuit, thereby facilitating fault maintenance.

According to a fourth aspect, another method diagnoses an insulation fault of a photovoltaic power generation system. The photovoltaic power generation system includes an insulation resistance detection apparatus, an inverter, and at least two direct current branch circuits. Each direct current branch circuit includes a DC-DC converter and a breaking apparatus. An input end of the DC-DC converter is connected to a corresponding photovoltaic unit, and an output end of the DC-DC converter is connected to an input end of the inverter. The method includes: controlling the DC-DC converter to perform direct current-direct current conversion on a direct current that is output by the corresponding photovoltaic unit, and then transmit a converted direct current to the inverter, controlling the inverter to invert the direct current transmitted by the DC-DC converter into an alternating current, and controlling the insulation resistance detection apparatus to detect, before the photovoltaic power generation system runs, a value of an insulation resistance to ground of the photovoltaic power generation system; when the value of the insulation resistance to ground is less than a preset resistance range, determining that an insulation fault occurs in the photovoltaic power generation system; and sequentially controlling breaking apparatuses on the direct current branch circuits to be disconnected, to determine a direct current branch circuit on which the insulation fault occurs.

Before the photovoltaic power generation system runs, the value of the insulation resistance to ground of the photovoltaic power generation system is detected by using the insulation resistance detection apparatus, so that it can be first determined whether an insulation fault occurs in the entire photovoltaic power generation system. When determining that an insulation fault occurs in the photovoltaic power generation system, the controller can sequentially control the breaking apparatuses on the direct current branch circuits to be disconnected, to determine a direct current branch circuit on which the insulation fault occurs, so that insulation fault isolation can be performed in time on the direct current branch circuit on which the insulation fault occurs, to eliminate a potential safety hazard.

Each direct current branch circuit of the photovoltaic power generation system includes the DC-DC converter and the leakage current detection apparatus. The leakage current detection apparatus can detect the leakage current of the direct current branch circuit on which the leakage current detection apparatus is located, and send a detection result of the leakage current to the controller. When an insulation fault occurs in the photovoltaic power generation system before the photovoltaic power generation system runs, a leakage current of a normal direct current branch circuit flows to a direct current branch circuit on which the insulation fault occurs. Therefore, a value of a leakage current of the direct current branch circuit on which the insulation fault occurs is a sum of values of leakage currents of all normal direct current branch circuits, and a direction of the leakage current of the direct current branch circuit on which the insulation fault occurs is opposite to directions of the leakage currents of all the normal direct current branch circuits. Therefore, the controller can determine, based on the values and the directions of the leakage currents of the direct current branch circuits, the direct current branch circuit on which the insulation fault occurs. When an insulation fault occurs in the photovoltaic power generation system when the photovoltaic power generation system runs, a value of a leakage current of a direct current branch circuit on which the insulation fault occurs significantly increases. Therefore, when the value of the leakage current of the direct current branch circuit exceeds the preset range, the controller can determine that the insulation fault occurs on the direct current branch circuit.

The photovoltaic power generation system can determine, before running or when running, a direct current branch circuit on which an insulation fault occurs, so that measures are taken in time for the direct current branch circuit on which the insulation fault occurs, for example, the direct current branch circuit on which the insulation fault occurs is controlled in time to stop working to isolate the insulation fault, to eliminate a potential safety hazard.

DETAILED DESCRIPTION OF THE EMBODIMENTS

Currently, for a photovoltaic power generation system that includes a plurality of direct current branch circuits, when an insulation fault occurs in the photovoltaic power generation system before the photovoltaic power generation system runs, normal startup of the photovoltaic power generation system is affected; or when an insulation fault occurs in the photovoltaic power generation system when the photovoltaic power generation system runs, if human or livestock is in contact with the photovoltaic power generation system, a potential safety hazard is caused. Therefore, insulation fault detection needs to be performed on the photovoltaic power generation system.

Figure 1:
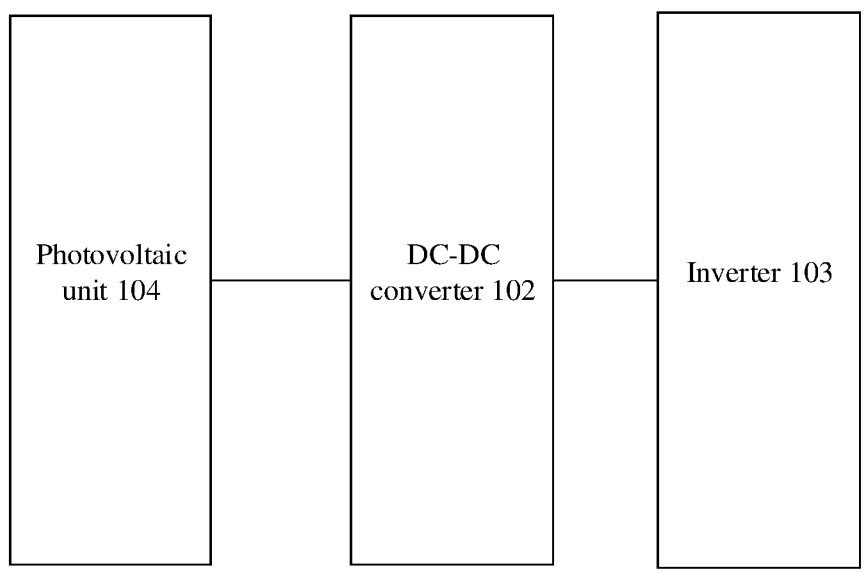
FIG. 1 is a schematic diagram of a photovoltaic power generation system.

The following first describes, with reference to the accompanying drawings, a method for performing insulation fault detection on a photovoltaic power generation system. FIG. 1 is a schematic diagram of a photovoltaic power generation system.

The photovoltaic power generation system includes a photovoltaic unit 104, a DC-DC converter 102, and an inverter 103.

The DC-DC converter 102 is configured to: perform direct current-direct current conversion on a direct current that is output by the corresponding photovoltaic unit 104, and then transmit a converted direct current to the inverter 103.

It may be determined, by detecting an insulation resistance to ground of the entire photovoltaic power generation system, whether an insulation fault occurs in the photovoltaic power generation system. When an insulation fault occurs in the photovoltaic power generation system, an insulation resistance value of the photovoltaic power generation system decreases. In this case, the photovoltaic power generation system can be powered off for troubleshooting.

However, when it is determined, by using the method, that an insulation fault occurs in the photovoltaic power generation system, a direct current branch circuit on which the insulation fault occurs cannot be positioned, and therefore the fault cannot be isolated before the photovoltaic power generation system runs or when the photovoltaic power generation system runs.

To resolve the foregoing problem, a photovoltaic power generation system and a method are provided. A leakage current detection apparatus is added to each direct current branch circuit of the photovoltaic power generation system, so that a leakage current of each direct current branch circuit can be detected and a detection result can be sent to a controller. The controller can determine, based on values and directions of leakage currents of the direct current branch circuits before the photovoltaic power generation system runs, a direct current branch circuit on which an insulation fault occurs, and can further determine, when a value of a leakage current of the direct current branch circuit exceeds a preset range when the photovoltaic power generation system runs, that an insulation fault occurs on the direct current branch circuit. Therefore, a direct current branch circuit on which an insulation fault occurs in the photovoltaic power generation system can be determined, so that the direct current branch circuit on which the insulation fault occurs can be controlled in time to stop working to isolate the insulation fault.

To make a person skilled in the art better understand the solutions, the following describes the solutions with reference to the accompanying drawings. In the following description, a direct current branch circuit on which an insulation fault occurs is referred to as a faulty branch circuit.

System Embodiment 1

This embodiment provides a photovoltaic power generation system. This is described in the following with reference to the accompanying drawings.

Figure 2:
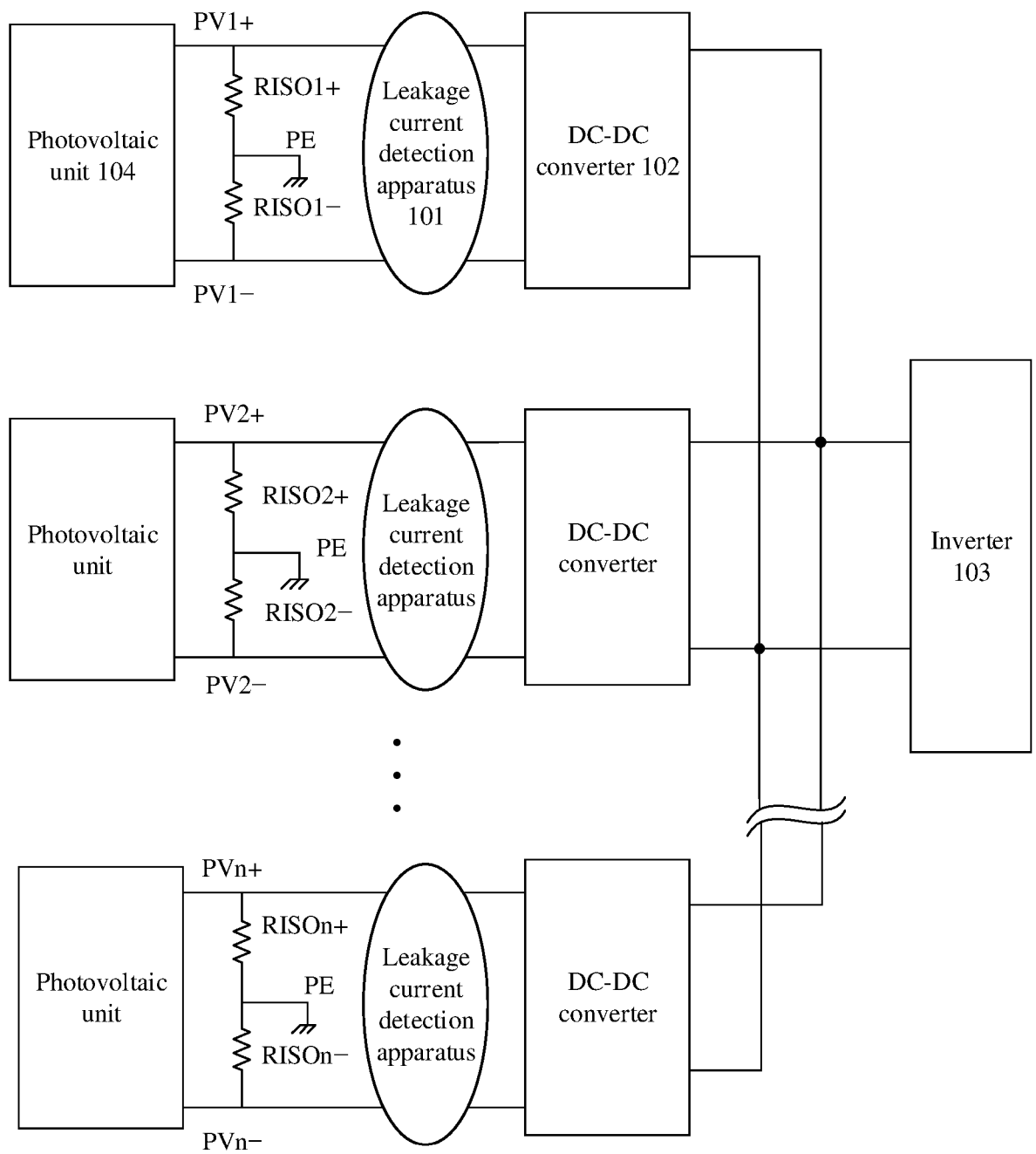
FIG. 2 is a schematic diagram of a photovoltaic power generation system according to an embodiment.

FIG. 2 is a schematic diagram of a photovoltaic power generation system according to an embodiment.

The photovoltaic power generation system includes an inverter 103, a controller (not shown in the figure), and at least two direct current branch circuits. In other words, a quantity of direct current branch circuits may be greater than or equal to two.

Each direct current branch circuit includes a leakage current detection apparatus 101 and a DC-DC converter 102.

An input end of the DC-DC converter 102 is connected to a corresponding photovoltaic unit 104, and an output end of the DC-DC converter 102 is connected to an input end of the inverter 103. The DC-DC converter 102 is configured to perform direct current-direct current conversion on a direct current that is output by the corresponding photovoltaic unit 104 and then transmit a converted direct current to the inverter 103.

The photovoltaic unit 104 in this embodiment may include one photovoltaic component or may include a plurality of photovoltaic component strings connected in parallel. For example, a plurality of photovoltaic components are first connected in series to form photovoltaic component strings, and then the plurality of photovoltaic component strings are connected in parallel to form a photovoltaic unit 104. A quantity of photovoltaic components is not limited in this embodiment, and may be set by a person skilled in the art based on an actual application scenario.

The DC-DC converter 102 is configured to perform power conversion, for example, may be a boost circuit, configured to implement MPPT adjustment.

The inverter 103 is configured to invert the direct current transmitted by the DC-DC converter 102 into an alternating current.

In the figure, an example in which the direct current branch circuits are first connected in parallel and then connected to the input end of the inverter 103 is used. It may be understood that the direct current branch circuits may be alternatively connected to different input ports of the inverter 103 and connected in parallel inside the inverter 103. This is not limited in this embodiment.

The leakage current detection apparatus 101 is configured to: detect a leakage current of the direct current branch circuit on which the leakage current detection apparatus 101 is located, and send the leakage current to the controller. The leakage current detection apparatus 101 detects a leakage current on a direct current side.

In FIG. 2, an example in which the leakage current detection apparatus 101 is located between the photovoltaic unit 104 and the DC-DC converter 102 is used. It may be understood that alternatively, the leakage current detection apparatus 101 of each direct current branch circuit may be integrated into the corresponding DC-DC converter 102 or integrated into the inverter 103, or may be separately disposed, for example, connected between the DC-DC converter 102 and the inverter 103.

When the leakage current detection apparatus 101 is integrated into the corresponding DC-DC converter 102, the leakage current detection apparatus 101 may be integrated into the input end of the DC-DC converter 102 or integrated into the output end of the DC-DC converter 102.

An example in which the leakage current detection apparatus 101 is located between the photovoltaic unit 104 and the DC-DC converter 102 is used in the following for description. When the leakage current detection apparatus 101 is located in another position, a working principle is similar, and details are not described in this embodiment.

In a possible implementation, the leakage current detection apparatus 101 is configured to: before the photovoltaic power generation system runs and when the photovoltaic power generation system runs, detect currents of a positive output branch circuit PV+ and a negative output branch circuit PV− of the photovoltaic unit 104 on the direct current branch circuit on which the leakage current detection apparatus 101 is located. The leakage current detection apparatus 101 may use a difference between a current value of the positive output branch circuit PV+ and a current value of the negative output branch circuit PV− as a leakage current detection value, and then send the leakage current detection value $I_{RCD}$ to the controller.

Before the photovoltaic power generation system runs, the controller determines, based on values and directions of leakage currents of the direct current branch circuits, a direct current branch circuit on which an insulation fault occurs.

When an insulation fault occurs on a direct current branch circuit, a leakage current of a normal direct current branch circuit flows to the direct current branch circuit on which the insulation fault occurs. Therefore, a value of a leakage current of the direct current branch circuit on which the insulation fault occurs is a sum of values of leakage currents of all normal direct current branch circuits, and a direction of the leakage current of the direct current branch circuit on which the insulation fault occurs is opposite to directions of the leakage currents of all the normal direct current branch circuits. Therefore, the controller can determine, based on the values and the directions of the leakage currents of the direct current branch circuits, the direct current branch circuit on which the insulation fault occurs. The following is an example.

An example in which the photovoltaic inverter system includes the following five direct current branch circuits: a direct current branch circuit 1 to a direct current branch circuit 5 and an insulation fault occurs on a PV1+ branch circuit of the direct current branch circuit 1 is used for description. For leakage current detection values of the direct current branch circuits, refer to Table 1.

TABLE 1

Data table of leakage current detection values during short circuit of a PV branch circuit

| | Leakage current detection value (mA) | | | | |
|---|---|---|---|---|---|
| | Direct current branch circuit 1 | Direct current branch circuit 2 | Direct current branch circuit 3 | Direct current branch circuit 4 | Direct current branch circuit 5 |
| Insulation fault on the PV1 + branch circuit | −40 | +10 | +10 | +10 | +10 |

In the table, the positive and negative signs in front of the leakage current detection values represent different directions of leakage currents. When the insulation fault occurs on the PV1+ branch circuit of the direct current branch circuit 1 before running, a leakage current of a normal direct current branch circuit flows to the direct current branch circuit on which the insulation fault occurs. Therefore, a value (that is, 40 mA) of a leakage current of the direct current branch circuit on which the insulation fault occurs is a sum (that is, 10 mA×4=40 mA) of values of leakage currents of all normal direct current branch circuits, and a direction of the leakage current of the direct current branch circuit on which the insulation fault occurs is opposite to directions of the leakage currents of all the normal direct current branch circuits. Therefore, the controller of the photovoltaic power generation system can determine, based on the values and the directions of the leakage currents of the direct current branch circuits, that the direct current branch circuit on which the insulation fault occurs is the direct current branch circuit 1.

It may be understood that the foregoing values are merely for illustration purposes. During actual detection, there may be relatively small differences. For example, a sum of absolute values of leakage currents of branch circuits on which an insulation fault occurs is approximately equal to a sum of absolute values of leakage currents of normal branch circuits.

When the photovoltaic power generation system determines that before running, no insulation fault occurs or an insulation fault has been eliminated, the photovoltaic power generation system can enter a running state. However, when the photovoltaic power generation system is in the running state, an insulation fault may occur due to accidental collision with human or livestock, rainy or snowy weather, or the like, and a leakage current of a direct current branch circuit on which the insulation fault occurs significantly increases. Therefore, it can be determined, based on a value of a leakage current of the direct current branch circuit, whether an insulation fault occurs on the direct current branch circuit.

A preset range that is of a value of a leakage current of the direct current branch circuit and that is obtained when no insulation fault occurs on the direct current branch circuit may be determined in advance. After the photovoltaic power generation system enters the running state, the leakage current detection apparatus 101 detects, in real time, a leakage current of the direct current branch circuit on which the leakage current detection apparatus 101 is located, and sends the leakage current to the controller. The controller is further configured to: when a value of the leakage current of the direct current branch circuit exceeds the preset range, determine that an insulation fault occurs on the direct current branch circuit. The preset range may be set based on an actual application scenario and is not limited in this embodiment.

Each direct current branch circuit of the photovoltaic power generation system provided in this embodiment includes the DC-DC converter and the leakage current detection apparatus. The leakage current detection apparatus can detect the leakage current of the direct current branch circuit on which the leakage current detection apparatus is located, and send a detection result of the leakage current to the controller of the photovoltaic power generation system. When an insulation fault occurs in the photovoltaic power generation system before the photovoltaic power generation system runs, a leakage current of a normal direct current branch circuit flows to a direct current branch circuit on which the insulation fault occurs. Therefore, a value of a leakage current of the direct current branch circuit on which the insulation fault occurs is a sum of values of leakage currents of all normal direct current branch circuits, and a direction of the leakage current of the direct current branch circuit on which the insulation fault occurs is opposite to directions of the leakage currents of all the normal direct current branch circuits. Therefore, the controller of the photovoltaic power generation system can determine, based on the values and the directions of the leakage currents of the direct current branch circuits, the direct current branch circuit on which the insulation fault occurs. When an insulation fault occurs in the photovoltaic power generation system when the photovoltaic power generation system runs, a value of a leakage current of a direct current branch circuit on which the insulation fault occurs significantly increases. Therefore, when the value of the leakage current of the direct current branch circuit exceeds the preset range, the controller can determine that the insulation fault occurs on the direct current branch circuit.

The photovoltaic power generation system provided in this embodiment can determine, before running or when running, a direct current branch circuit on which an insulation fault occurs, so that the direct current branch circuit on which the insulation fault occurs can be controlled in time to stop working to isolate the insulation fault, to eliminate a potential safety hazard.

Each direct current branch circuit of the photovoltaic power generation system provided in the foregoing embodiment includes the leakage current detection apparatus, so that the leakage current of the corresponding direct current branch circuit can be detected before the photovoltaic power generation system runs. An embodiment further provides a photovoltaic power generation system, so that a value of an insulation resistance to ground of the photovoltaic power generation system can be detected, so that it can be first determined whether an insulation fault occurs in the entire photovoltaic power generation system. When it is determined that an insulation fault occurs in the photovoltaic power generation system, a direct current branch circuit on which the insulation fault occurs is positioned based on leakage currents detected by a leakage current detection apparatus. If no insulation fault occurs, no insulation fault needs to be positioned based on leakage currents detected by the leakage current detection apparatus, thereby improving working efficiency. The following provides descriptions with reference to the accompanying drawing.

System Embodiment 2

Figure 3:
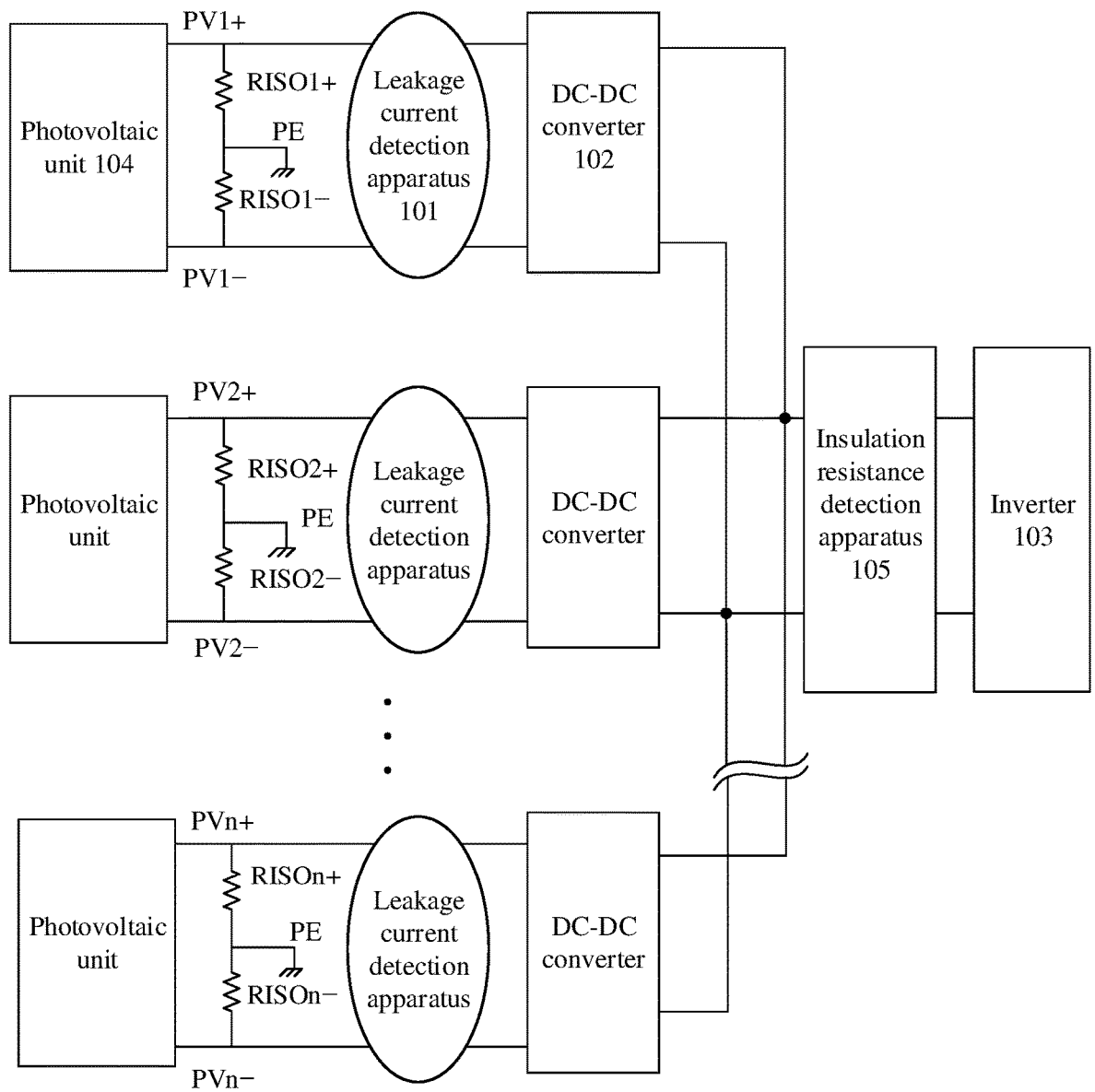
FIG. 3 is a schematic diagram of another photovoltaic power generation system according to an embodiment.

FIG. 3 is a schematic diagram of another photovoltaic power generation system according to an embodiment.

A difference between the photovoltaic power generation system and the photovoltaic power generation system provided in System Embodiment 1 lies in that the photovoltaic power generation system further includes an insulation resistance detection apparatus 105. For descriptions of remaining parts, refer to the foregoing embodiment. Details are not described herein again in this embodiment.

In this embodiment, an example in which direct current branch circuits are first connected in parallel and then connected to an input end of an inverter 103 and the insulation resistance detection apparatus 105 is connected to a direct current bus of the photovoltaic power generation system is used for description. In other words, the insulation resistance detection apparatus 105 may be an independent apparatus. It may be understood that alternatively, the insulation resistance detection apparatus 105 may be integrated into the inverter 103, integrated into a DC-DC converter 102, or integrated into a photovoltaic unit 104, or may be disposed outside the photovoltaic power generation system. When the insulation resistance detection apparatus 105 is integrated into the DC-DC converter 102, the insulation resistance detection apparatus 105 may be integrated into an input end or an output end of the DC-DC converter 102. A disposition position of the insulation resistance detection apparatus 105 is not limited in this embodiment.

When no insulation fault occurs in the photovoltaic power generation system, the photovoltaic power generation system is insulated from ground. When an insulation fault occurs in the photovoltaic power generation system, a value of an insulation resistance to ground of the photovoltaic power generation system decreases. Therefore, a preset resistance range that is of the photovoltaic power generation system and that is obtained when no insulation fault occurs in the photovoltaic power generation system may be determined in advance. Before the photovoltaic power generation system runs, the insulation resistance detection apparatus 105 is used to detect a value of an insulation resistance to ground of the photovoltaic power generation system and send the value of the insulation resistance to ground to a controller. The controller is further configured to: when the value of the insulation resistance to ground is less than the preset resistance range, determine that the insulation fault occurs in the photovoltaic power generation system.

The preset resistance range may be set based on an actual application scenario and is not limited herein in this embodiment.

The photovoltaic power generation system provided in this embodiment further has the insulation resistance detection apparatus, so that the value of the insulation resistance to ground of the photovoltaic power generation system can be detected, and the value of the insulation resistance to ground can be sent to the controller, so that the controller can determine, when the value of the insulation resistance to ground is less than the preset resistance range, that the insulation fault occurs in the photovoltaic power generation system. When it is determined that the insulation fault occurs in the photovoltaic power generation system, leakage current detection apparatuses may be used to detect leakage currents of the direct current branch circuits, and send the leakage currents to the controller, so that the controller determines, based on values and directions of the leakage currents of the direct current branch circuits, a direct current branch circuit on which the insulation fault occurs. When it is determined that no insulation fault occurs in the photovoltaic power generation system, the leakage current detection apparatuses do not need to detect leakage currents of the direct current branch circuits. Therefore, insulation resistance detection efficiency can be improved.

To avoid erroneous determining of a controller to more accurately determine whether an insulation fault occurs on a direct current branch circuit, thereby effectively isolating an insulation fault, Embodiment 3 further provides a photovoltaic power generation system, so that it can be further determined, based on a voltage to ground of an input end or a voltage to ground of an output end of a DC-DC converter, whether an insulation fault occurs on a direct current branch circuit, to verify whether an insulation fault determined based on leakage currents is accurate. This is described in the following with reference to the accompanying drawings.

System Embodiment 3

Figure 4:
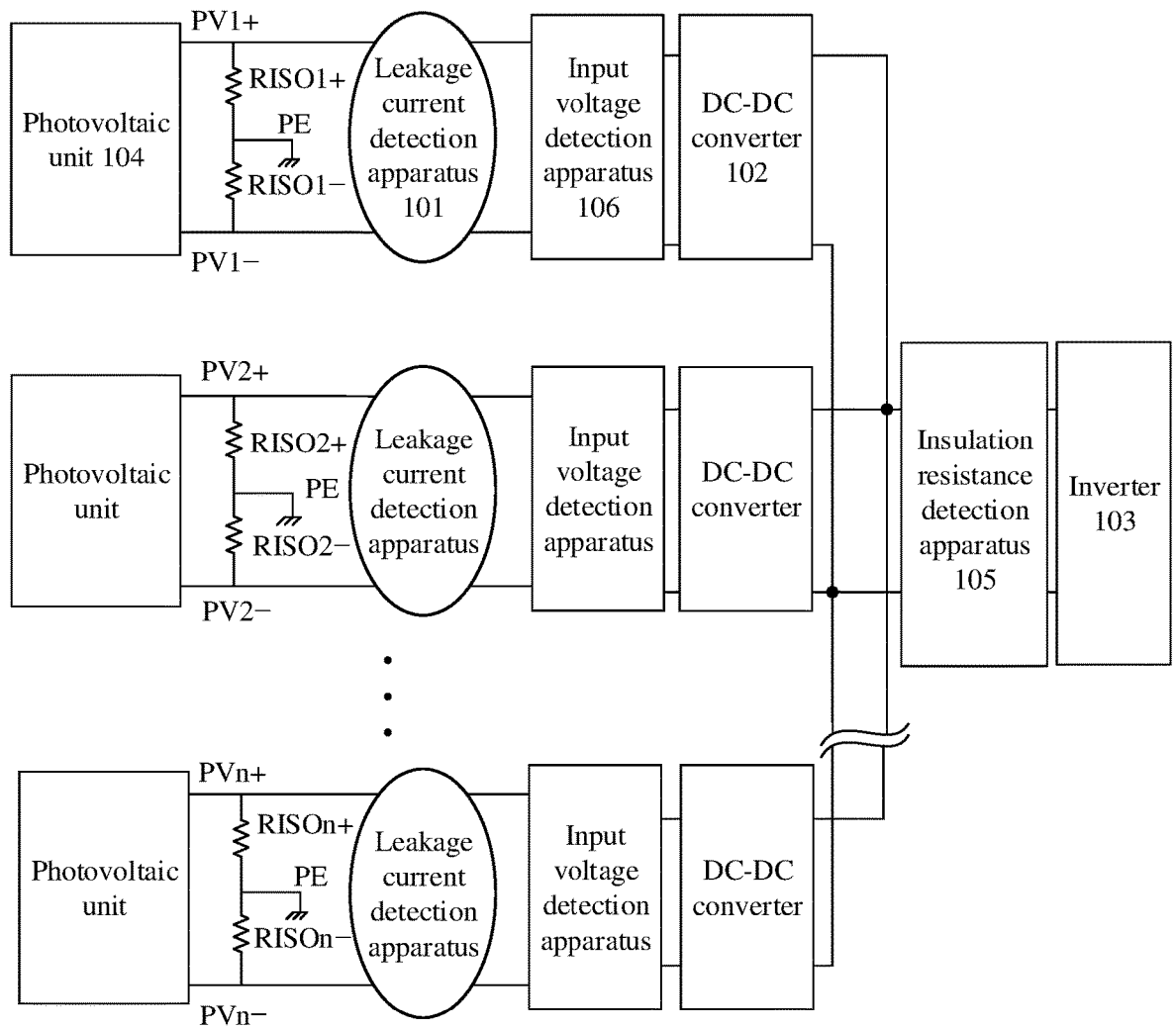
FIG. 4 is a schematic diagram of still another photovoltaic power generation system according to an embodiment.

FIG. 4 is a schematic diagram of still another photovoltaic power generation system according to an embodiment.

A difference between the photovoltaic power generation system and the photovoltaic power generation system provided in System Embodiment 2 lies in that each direct current branch circuit further includes an input voltage detection apparatus 106. For descriptions of remaining parts, refer to the foregoing embodiment. Details are not described herein again in this embodiment.

The input voltage detection apparatus 106 may be connected to an input end of a DC-DC converter 102, may be integrated into the DC-DC converter 102, may be integrated into a photovoltaic unit 104 or may be separately disposed. This is not limited in this embodiment.

The input voltage detection apparatus 106 is configured to detect a voltage to ground of the input end of the DC-DC converter 102 of the corresponding direct current branch circuit. The voltage to ground of the input end may include a voltage to ground of a positive input end and a voltage to ground of a negative input end. The input voltage detection apparatus 106 may further send a detection result to a controller.

When an insulation fault occurs at the input end of the DC-DC converter 102, the voltage to ground of the input end decreases. Therefore, a preset input voltage range that is of the direct current branch circuit and that is obtained when no insulation fault occurs on the direct current branch circuit may be determined in advance. The preset input voltage range may include a preset input voltage range corresponding to the positive input end and a preset input voltage range corresponding to the negative input end.

The controller compares, with the preset input voltage range corresponding to the positive input end, the voltage to ground that is of the positive input end and that is detected by the input voltage detection apparatus 106 and compares the voltage to ground of the negative input end with the preset input voltage range corresponding to the negative input end.

The preset input voltage range may be set based on an actual application scenario and is not limited herein in this embodiment. For example, when an insulation fault to ground occurs at the positive input end of the DC-DC converter 102, the input voltage detection apparatus 106 detects a voltage of the positive input end. The controller may compare the detected voltage with a preset value. For example, when the preset value is 0, when the detected voltage is 0, it is determined that an insulation fault to ground occurs at the positive input end. For another example, when the preset value is a positive value near 0, when the detected voltage is less than or equal to the preset value, it is determined that an insulation fault to ground occurs at the positive input end.

When determining that the voltage to ground of the input end of the DC-DC converter 102 is less than the preset input voltage range, the controller determines that an insulation fault occurs on the corresponding direct current branch circuit. In this case, the controller may perform comparison verification on the determining conclusion and the determining conclusion obtained by using the leakage current of the direct current branch circuit in System Embodiment 1, to improve insulation fault detection accuracy. Therefore, erroneous determining of the controller can be effectively avoided, so that an insulation fault can be effectively isolated.

Figure 5:
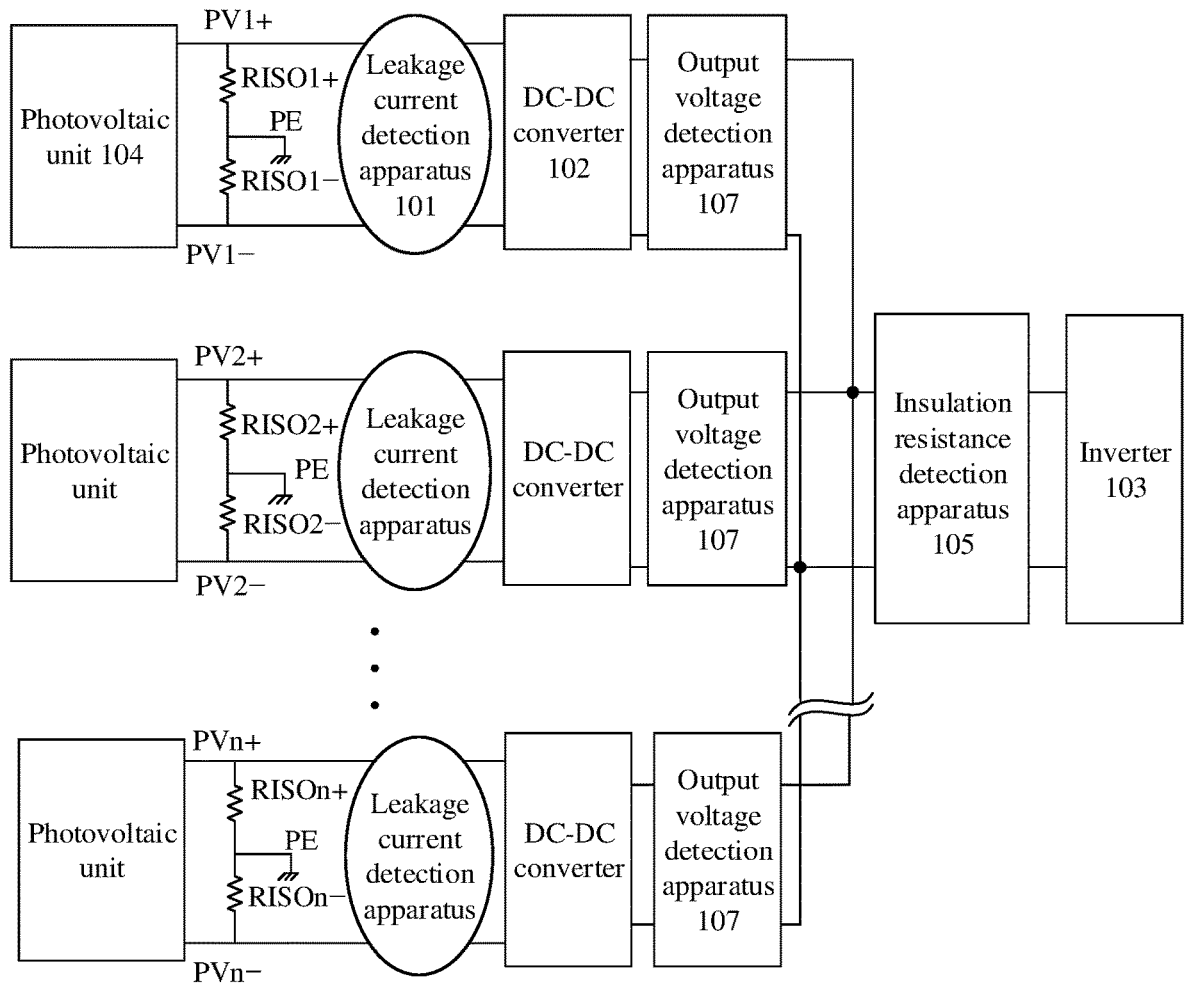
FIG. 5 is a schematic diagram of yet another photovoltaic power generation system according to an embodiment.

FIG. 5 is a schematic diagram of yet another photovoltaic power generation system according to an embodiment.

A difference between the photovoltaic power generation system and the photovoltaic power generation system provided in System Embodiment 2 lies in that each direct current branch circuit further includes an output voltage detection apparatus 107. For descriptions of remaining parts, refer to the foregoing embodiment. Details are not described herein again in this embodiment.

The output voltage detection apparatus 107 is connected to an output end of a DC-DC converter 102 and may be integrated into the DC-DC converter 102 or may be separately disposed. This is not limited in this embodiment.

The output voltage detection apparatus 107 is configured to detect a voltage to ground of the output end of the DC-DC converter 102 of the corresponding direct current branch circuit. The voltage to ground of the output end may include a voltage to earth of a positive output end and a voltage to ground of a negative output end. The output voltage detection apparatus 107 may further send a detection result to a controller.

When an insulation fault occurs at the output end of the DC-DC converter 102, the voltage to ground of the output end decreases. Therefore, a preset output voltage range that is of the direct current branch circuit and that is obtained when no insulation fault occurs on the direct current branch circuit may be determined in advance. The preset output voltage range may include a preset output voltage range corresponding to the positive output end and a preset output voltage range corresponding to the negative output end.

The controller compares, with the preset output voltage range corresponding to the positive output end, the voltage to ground that is of the positive output end and that is detected by the output voltage detection apparatus 107 and compares the voltage to ground of the negative output end with the preset output voltage range corresponding to the negative output end.

The preset output voltage range may be set based on an actual application scenario and is not limited herein in this embodiment.

When determining that the voltage to ground of the output end of the DC-DC converter 102 is less than the preset output voltage range, the controller determines that an insulation fault occurs on the corresponding direct current branch circuit. In this case, the controller may perform comparison verification on the determining conclusion and the determining conclusion obtained by using the leakage current of the direct current branch circuit in System Embodiment 1, to improve insulation fault detection accuracy. Therefore, erroneous determining of the controller can be effectively avoided, so that an insulation fault can be effectively isolated.

Figure 6:
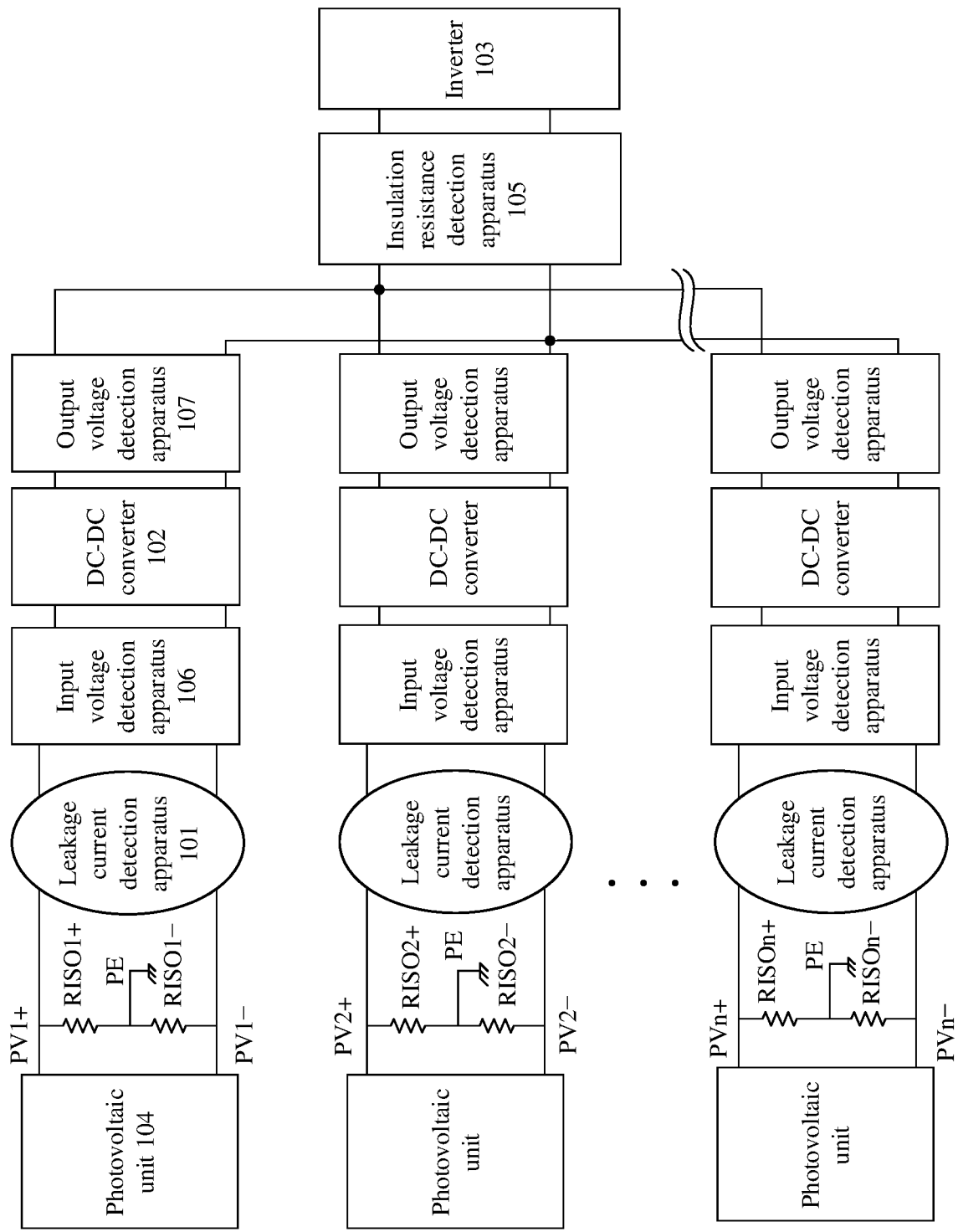
FIG. 6 is a schematic diagram of still yet another photovoltaic power generation system according to an embodiment.

FIG. 6 is a schematic diagram of still yet another photovoltaic power generation system according to an embodiment.

A difference between the photovoltaic power generation system and the photovoltaic power generation system provided in System Embodiment 2 lies in that each direct current branch circuit further includes an input voltage detection apparatus 106 and an output voltage detection apparatus 107. For descriptions of remaining parts, refer to the foregoing embodiment. Details are not described herein again in this embodiment.

For descriptions of the input voltage detection apparatus 106, refer to the related descriptions corresponding to FIG. 4 in this embodiment. For descriptions of the output voltage detection apparatus 107, refer to the related descriptions corresponding to FIG. 5 in this embodiment. Details are not described herein again.

In the photovoltaic power generation system, voltage detection apparatuses are added to both an input end and an output end of a DC-DC converter 102, so that a controller can more accurately determine, based on detection results of the voltage detection apparatuses at the input end and the output end of the DC-DC converter 102, a direct current branch circuit on which an insulation fault occurs. In this case, the controller may perform comparison verification on the obtained determining conclusion and the determining conclusion obtained by using the leakage current of the direct current branch circuit in System Embodiment 1, to further improve insulation fault detection accuracy. Therefore, erroneous determining of the controller can be effectively avoided, so that an insulation fault can be effectively isolated.

In conclusion, a leakage current detection apparatus is added to each direct current branch circuit of the photovoltaic power generation system provided in this embodiment, and further a voltage detection apparatus is added to at least one of the input end and the output end of the DC-DC converter, so that the controller determines, based on a detection result of the voltage detection apparatus, a direct current branch circuit on which an insulation fault occurs, or may perform comparison verification on the obtained determining conclusion and the determining conclusion obtained by using the leakage current of the direct current branch circuit in System Embodiment 1, to further improve insulation fault detection accuracy. Therefore, the photovoltaic power generation system provided in this embodiment can effectively avoid erroneous determining of the controller, thereby improving accuracy during insulation fault isolation.

Because the photovoltaic power generation system provided in this embodiment can determine a direct current branch circuit on which an insulation fault occurs, the faulty branch circuit can be further controlled to be disconnected, to implement insulation fault isolation. In a possible implementation, a power converter of the faulty branch circuit may be controlled, by using the controller, to be powered off to isolate the insulation fault. In another possible implementation, a breaking apparatus may be added to each direct current branch circuit to isolate the insulation fault. This is described in the following with reference to the accompanying drawings.

System Embodiment 4

Figure 7:
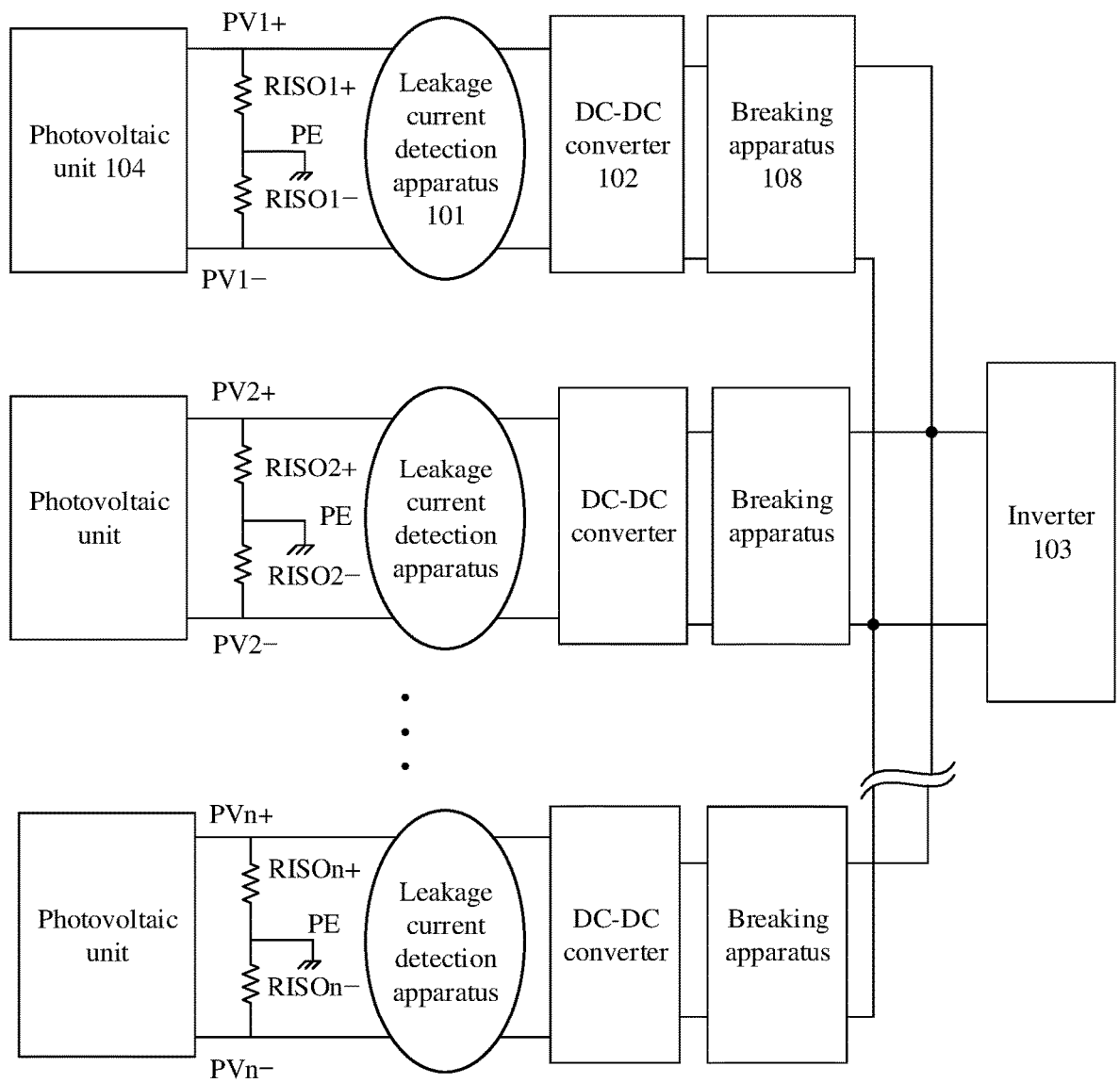
FIG. 7 is a schematic diagram of a further photovoltaic power generation system according to an embodiment.

FIG. 7 is a schematic diagram of a further photovoltaic power generation system according to an embodiment.

A difference between the photovoltaic power generation system and the photovoltaic power generation system provided in System Embodiment 1 lies in that each direct current branch circuit further includes a breaking apparatus 108. For descriptions of remaining parts, refer to the foregoing embodiment. Details are not described herein again in this embodiment.

In the figure, an example in which the breaking apparatus 108 is disposed at an output end of a DC-DC converter 102 and is used as an independent apparatus is used. It may be understood that in actual application, alternatively, the breaking apparatus 108 may be disposed at an input end of the DC-DC converter 102 as an independent apparatus, integrated into an input end of the DC-DC converter 102, integrated into an input end of an inverter 103, or integrated into a photovoltaic unit 104. In addition, when direct current branch circuits are connected to different input ports of the inverter 103 and connected in parallel inside the inverter 103, the breaking apparatus 108 may be alternatively integrated into the inverter 103. A disposition position of the breaking apparatus 108 in the photovoltaic power generation system is not limited in this embodiment.

A controller is further configured to: when determining that an insulation fault occurs on the direct current branch circuit, control the breaking apparatus 108 on the direct current branch circuit on which the insulation fault occurs to be disconnected. After the breaking apparatus 108 is disconnected, the faulty branch circuit on which the breaking apparatus 108 is located is broken. Therefore, the faulty branch circuit cannot be connected to the inverter 103, thereby implementing insulation fault isolation.

Further, after controlling the breaking apparatus 108 on the direct current branch circuit on which the insulation fault occurs to be disconnected, the controller controls the DC-DC converter 102 on the direct current branch circuit on which the insulation fault occurs to be powered off.

Figure 8:
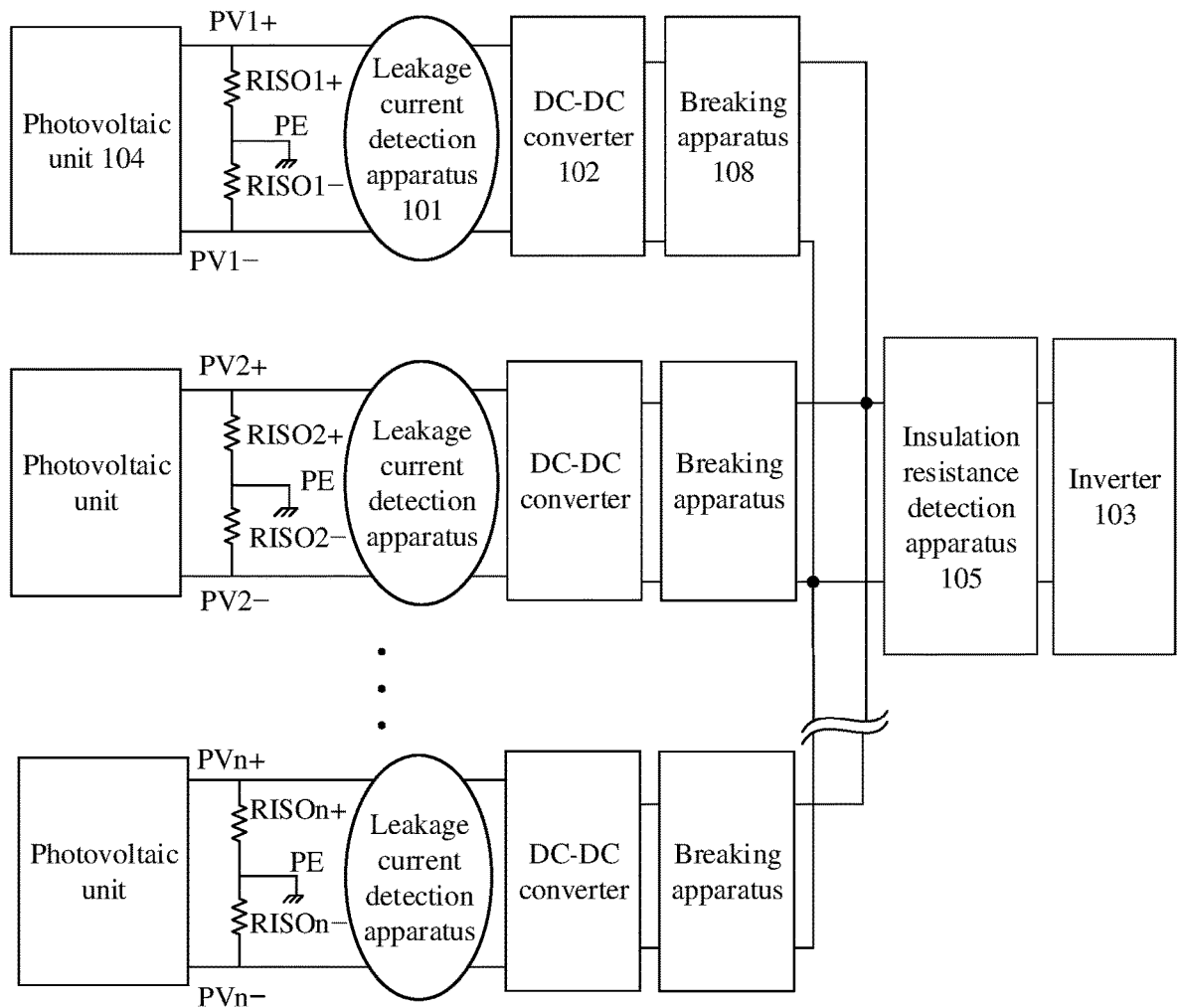
FIG. 8 is a schematic diagram of a still further photovoltaic power generation system according to an embodiment.

FIG. 8 is a schematic diagram of a still further photovoltaic power generation system according to an embodiment.

The photovoltaic power generation system further includes an insulation resistance detection apparatus 105, so that a value of an insulation resistance to ground of the photovoltaic power generation system can be detected, and the value of the insulation resistance to ground can be sent to a controller, so that the controller can determine, when the value of the insulation resistance to ground is less than a preset resistance range, that an insulation fault occurs in the photovoltaic power generation system. When it is determined that the insulation fault occurs in the photovoltaic power generation system, leakage current detection apparatuses may be used to detect leakage currents of direct current branch circuits, and send the leakage currents to the controller, so that the controller determines, based on values and directions of the leakage currents of the direct current branch circuits, a direct current branch circuit on which the insulation fault occurs. When it is determined that no insulation fault occurs in the photovoltaic power generation system, the leakage current detection apparatuses do not need to detect leakage currents of the direct current branch circuits. Therefore, insulation resistance detection efficiency can be improved.

Further, an input voltage detection apparatus 106 may be also added to an input end of a DC-DC converter 102 of each direct current branch circuit and/or an output voltage detection apparatus 107 may be also added to an output end of the DC-DC converter 102. For details, refer to the related descriptions in System Embodiment 3. Details are not described herein again in this embodiment.

In addition to the leakage current detection apparatus, the breaking apparatus is also added to each direct current branch circuit of the photovoltaic power generation system provided in this embodiment, so that when the controller determines, based on a detection result of the leakage current detection apparatus, a direct current branch circuit on which an insulation fault occurs, the controller may further control a breaking apparatus on the direct current branch circuit on which the insulation fault occurs to be disconnected, to implement insulation fault isolation.

In any one of the foregoing system embodiments, a leakage current of a direct current branch circuit on which a leakage current detection apparatus is located may be detected by using the leakage current detection apparatus, so that a direct current branch circuit on which an insulation fault occurs is determined by using a controller. An embodiment further provides a photovoltaic power generation system. Each direct current branch circuit includes a breaking apparatus but does not include a leakage current detection apparatus. When determining that an insulation fault occurs in the photovoltaic power generation system before the photovoltaic power generation system runs, a controller sequentially controls breaking apparatuses on direct current branch circuits to be disconnected, to determine a direct current branch circuit on which the insulation fault occurs. This is described in the following with reference to the accompanying drawings.

System Embodiment 5

Figure 9:
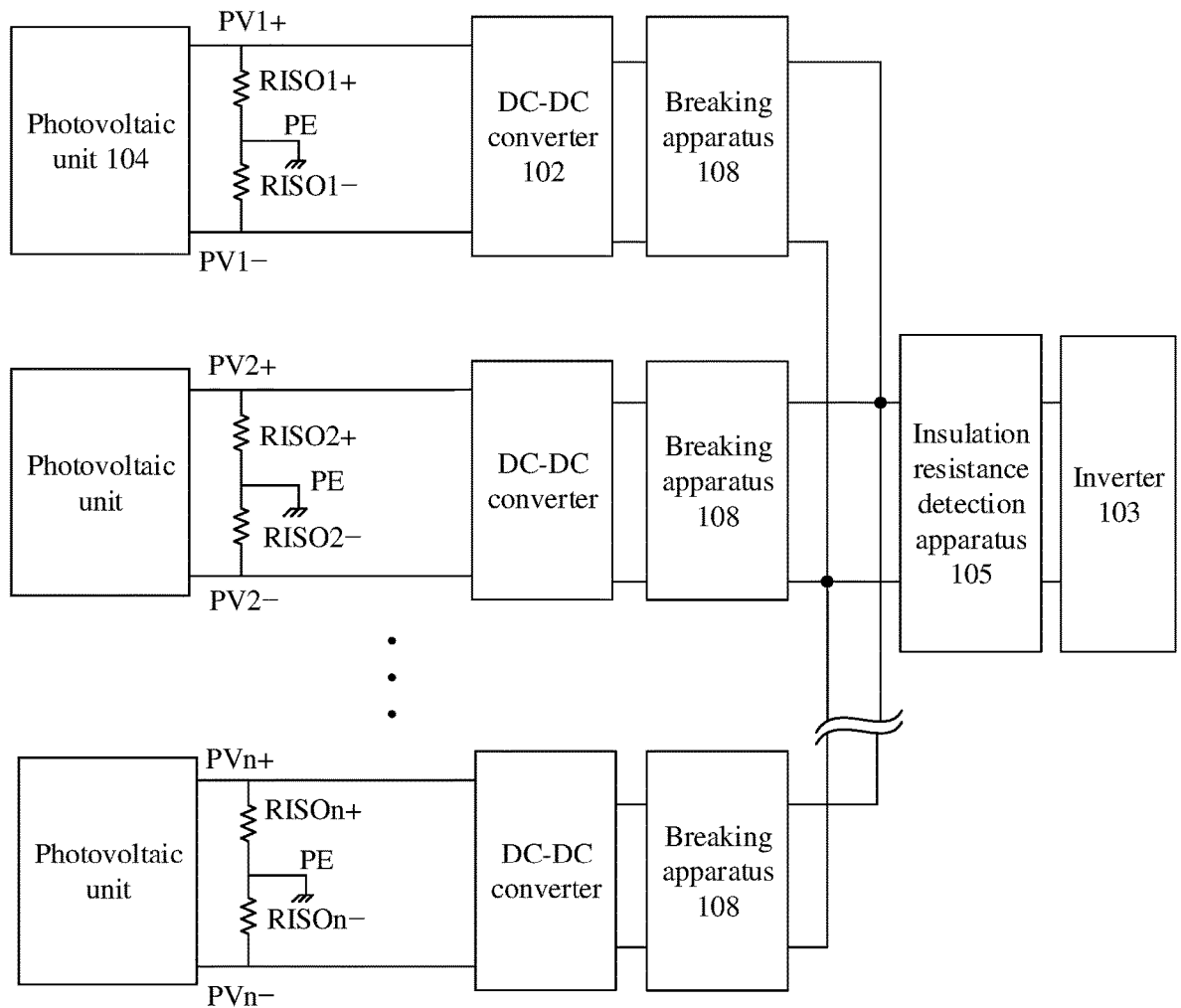
FIG. 9 is a schematic diagram of a yet further photovoltaic power generation system according to an embodiment.

FIG. 9 is a schematic diagram of a yet further photovoltaic power generation system according to an embodiment.

The photovoltaic power generation system provided in this embodiment includes an insulation resistance detection apparatus 105, an inverter 103, a controller (not shown in the figure), and at least two direct current branch circuits. In other words, a quantity of direct current branch circuits may be greater than or equal to 2.

Each direct current branch circuit includes a DC-DC converter 102 and a breaking apparatus 108.

An input end of the DC-DC converter 102 is connected to a corresponding photovoltaic unit 104, and an output end of the DC-DC converter 102 is connected to an input end of the inverter 103. The photovoltaic unit 104 in this embodiment may include one photovoltaic component or may include a plurality of photovoltaic component strings connected in parallel. For example, a plurality of photovoltaic components are first connected in series to form photovoltaic component strings, and then the plurality of photovoltaic component strings are connected in parallel to form a photovoltaic unit 104. A quantity of photovoltaic components is not limited in this embodiment, and may be set by a person skilled in the art based on an actual application scenario.

The DC-DC converter 102 is configured to perform power conversion, for example, may be a boost circuit, configured to implement MPPT adjustment. The DC-DC converter 102 performs direct current-direct current conversion on a direct current that is output by the corresponding photovoltaic unit 104, and then transmits a converted direct current to the inverter 103.

The inverter 103 is configured to invert the direct current transmitted by the DC-DC converter 102 into an alternating current.

In the figure, an example in which the direct current branch circuits are first connected in parallel and then connected to the input end of the inverter 103 is used. It may be understood that the direct current branch circuits may be alternatively connected to different input ports of the inverter 103 and connected in parallel inside the inverter 103. This is not limited in this embodiment.

When no insulation fault occurs in the photovoltaic power generation system, the photovoltaic power generation system is insulated from ground. When an insulation fault occurs in the photovoltaic power generation system, a value of an insulation resistance to ground of the photovoltaic power generation system decreases. Therefore, a preset resistance range that is of the photovoltaic power generation system and that is obtained when no insulation fault occurs in the photovoltaic power generation system may be determined in advance. Before the photovoltaic power generation system runs, the insulation resistance detection apparatus 105 is used to detect a value of an insulation resistance to ground of the photovoltaic power generation system and send the value of the insulation resistance to ground to a controller. The controller can determine, when the value of the insulation resistance to ground is less than the preset resistance range, that the insulation fault occurs in the photovoltaic power generation system.

The controller can further sequentially control breaking apparatuses 108 on the direct current branch circuits to be disconnected, to determine a direct current branch circuit on which the insulation fault occurs.

When a breaking apparatus 108 breaks the direct current branch circuit on which the insulation fault occurs, it is equivalent that insulation fault isolation is implemented. After the photovoltaic power generation system isolates the insulation fault, the photovoltaic power generation system recovers to be insulated from ground. Therefore, if the breaking apparatus 108 breaks the direct current branch circuit on which the insulation fault occurs, a detection result of the insulation resistance detection apparatus 105 recovers to be in the preset resistance range. The controller may sequentially control the breaking apparatuses 108 on the direct current branch circuits to be disconnected, and further determine, based on a detection result that is of the insulation resistance detection apparatus 105 and that is obtained after the breaking apparatus 108 is disconnected, the direct current branch circuit on which the insulation fault occurs.

In conclusion, according to the photovoltaic power generation system provided in this embodiment, before the photovoltaic power generation system runs, the value of the insulation resistance to ground of the photovoltaic power generation system is detected by using the insulation resistance detection apparatus 105, so that it can be first determined whether an insulation fault occurs in the entire photovoltaic power generation system. When determining that an insulation fault occurs in the photovoltaic power generation system, the controller can sequentially control the breaking apparatuses 108 on the direct current branch circuits to be disconnected, to determine a direct current branch circuit on which the insulation fault occurs, so that insulation fault isolation can be performed in time on the direct current branch circuit on which the insulation fault occurs, to eliminate a potential safety hazard.

Method Embodiment 1

Based on the photovoltaic power generation system provided in the foregoing embodiment, an embodiment further provides a method for diagnosing an insulation fault of a photovoltaic power generation system. This is described in the following with reference to the accompanying drawings.

Figure 10:
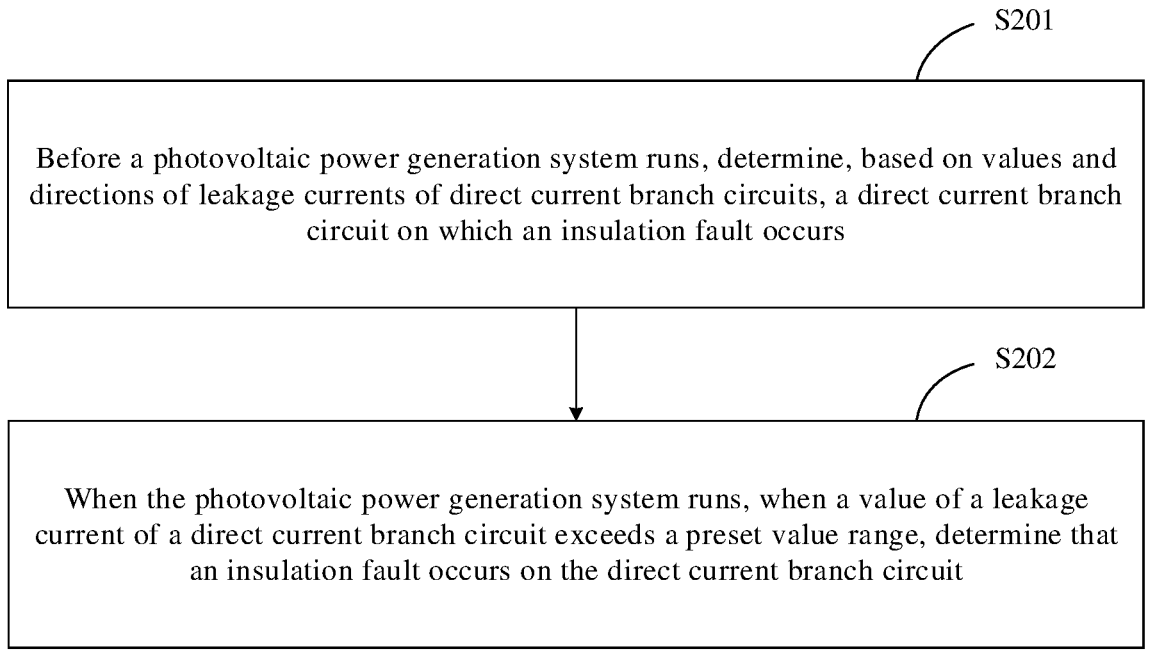
FIG. 10 is a flowchart of a method for diagnosing an insulation fault of a photovoltaic power generation system according to an embodiment.

FIG. 10 is a flowchart of a method for diagnosing an insulation fault of a photovoltaic power generation system according to an embodiment.

The photovoltaic power generation system includes an inverter, a controller, and at least two direct current branch circuits.

Each direct current branch circuit includes a DC-DC converter and a leakage current detection apparatus. An input end of the DC-DC converter is connected to a corresponding photovoltaic unit, and an output end of the DC-DC converter is connected to an input end of the inverter.

The DC-DC converter is configured to: perform direct current-direct current conversion on a direct current that is output by the corresponding photovoltaic unit, and then send a converted direct current to the inverter.

The inverter is configured to invert the direct current transmitted by the DC-DC converter into an alternating current.

The leakage current detection apparatus is configured to detect a leakage current of the direct current branch circuit on which the leakage current detection apparatus is located.

For descriptions of the photovoltaic power generation system, refer to System Embodiment 1. Details are not described herein again in this embodiment.

The method in this embodiment may be implemented by a controller. The method provided in this embodiment includes the following steps:

S201. Before the photovoltaic power generation system runs, determine, based on values and directions of leakage currents of the direct current branch circuits, a direct current branch circuit on which an insulation fault occurs.

Before the photovoltaic power generation system runs, the leakage current detection apparatus of each direct current branch circuit detects a leakage current of the direct current branch circuit on which the leakage current detection apparatus is located, and sends a detection result of the leakage current to the controller.

When an insulation fault occurs on a direct current branch circuit, a leakage current of a normal direct current branch circuit flows to the direct current branch circuit on which the insulation fault occurs. Therefore, a value of a leakage current of the direct current branch circuit on which the insulation fault occurs is a sum of values of leakage currents of all normal direct current branch circuits, and a direction of the leakage current of the direct current branch circuit on which the insulation fault occurs is opposite to directions of the leakage currents of all the normal direct current branch circuits. Therefore, the controller can determine, based on the values and the directions of the leakage currents of the direct current branch circuits, the direct current branch circuit on which the insulation fault occurs.

S202. When the photovoltaic power generation system runs, when a value of a leakage current of the direct current branch circuit exceeds a preset range, determine that an insulation fault occurs on the direct current branch circuit.

When the photovoltaic power generation system runs, a value of a leakage current of a direct current branch circuit on which an insulation fault occurs significantly increases. Therefore, it can be determined, based on the value of the leakage current of the direct current branch circuit, whether an insulation fault occurs on the direct current branch circuit.

The preset range that is of a value of a leakage current of the direct current branch circuit and that is obtained when no insulation fault occurs on the direct current branch circuit may be determined in advance. After the photovoltaic power generation system enters a running state, the leakage current detection apparatus detects, in real time, a leakage current of the direct current branch circuit on which the leakage current detection apparatus is located, and sends the leakage current to the controller.

The controller is further configured to: when the value of the leakage current of the direct current branch circuit exceeds the preset range, determine that the insulation fault occurs on the direct current branch circuit. The preset range may be set based on an actual application scenario and is not limited in this embodiment.

In conclusion, according to the method for diagnosing an insulation fault of a photovoltaic power generation system provided in this embodiment, before the photovoltaic power generation system runs, the direct current branch circuit on which the insulation fault occurs can be determined based on the values and the directions of the leakage currents of the direct current branch circuits; and further, when the photovoltaic power generation system runs, when the value of the leakage current of the direct current branch circuit exceeds the preset range, it can be determined that the insulation fault occurs on the direct current branch circuit. Therefore, according to the method, a direct current branch circuit on which an insulation fault occurs can be determined before the photovoltaic power generation system runs or when the photovoltaic power generation system runs, so that the direct current branch circuit on which the insulation fault occurs can be controlled in time to stop working to isolate the insulation fault, to eliminate a potential safety hazard.

Further, when the photovoltaic power generation system further includes an insulation resistance detection apparatus, before S201, the method may further include the following steps:

obtaining a value of an insulation resistance to ground of the photovoltaic power generation system; and when the value of the insulation resistance to ground is less than a preset resistance range, determining that the insulation fault occurs in the photovoltaic power generation system.

When no insulation fault occurs in the photovoltaic power generation system, the photovoltaic power generation system is insulated from ground. When an insulation fault occurs in the photovoltaic power generation system, a value of an insulation resistance to ground of the photovoltaic power generation system decreases. Therefore, the preset resistance range that is of the photovoltaic power generation system and that is obtained when no insulation fault occurs in the photovoltaic power generation system may be determined in advance. Before the photovoltaic power generation system runs, the insulation resistance detection apparatus is used to detect the value of the insulation resistance to ground of the photovoltaic power generation system and send the value of the insulation resistance to ground to the controller.

The controller can determine, when the value of the insulation resistance to ground is less than the preset resistance range, that the insulation fault occurs in the photovoltaic power generation system.

When it is determined that the insulation fault occurs in the photovoltaic power generation system, leakage current detection apparatuses may be used to detect leakage currents of the direct current branch circuits, and send the leakage currents to the controller, so that the controller determines, based on values and directions of the leakage currents of the direct current branch circuits, a direct current branch circuit on which the insulation fault occurs. When it is determined that no insulation fault occurs in the photovoltaic power generation system, the leakage current detection apparatuses may be controlled to no longer detect leakage currents of the direct current branch circuits. Therefore, insulation resistance detection efficiency can be improved.

Further, when the input end of the DC-DC converter of each direct current branch circuit is connected to an input voltage detection apparatus, the method further includes the following steps:

obtaining a voltage to ground of the input end of the DC-DC converter of the corresponding direct current branch circuit; and when the voltage to ground of the input end of the DC-DC converter is less than a preset input voltage range, determining that an insulation fault occurs on the corresponding direct current branch circuit.

The voltage to ground of the input end of the DC-DC converter of the corresponding direct current branch circuit is detected by using the input voltage detection apparatus. The voltage to ground of the input end may include a voltage to ground of a positive input end and a voltage to ground of a negative input end. The input voltage detection apparatus may further send a detection result to the controller.

When an insulation fault occurs at the input end of the DC-DC converter, the voltage to ground of the input end decreases. Therefore, the preset input voltage range that is of the direct current branch circuit and that is obtained when no insulation fault occurs on the direct current branch circuit may be determined in advance. The preset input voltage range may include a preset input voltage range corresponding to the positive input end and a preset input voltage range corresponding to the negative input end.

The controller can compare, with the preset input voltage range corresponding to the positive input end, the voltage to ground that is of the positive input end and that is detected by the input voltage detection apparatus and compare the voltage to ground of the negative input end with the preset input voltage range corresponding to the negative input end. When determining that the voltage to ground of the input end of the DC-DC converter is less than the preset input voltage range, the controller determines that the insulation fault occurs on the corresponding direct current branch circuit. In this case, the controller may perform comparison verification on the determining conclusion and the determining conclusion obtained by using the leakage current of the direct current branch circuit in S202, to improve insulation fault detection accuracy. Therefore, erroneous determining of the controller can be effectively avoided, so that an insulation fault can be effectively isolated.

Further, when the output end of the DC-DC converter of each direct current branch circuit is connected to an output voltage detection apparatus, the method further includes the following steps:

obtaining a voltage to ground of the output end of the DC-DC converter of the corresponding direct current branch circuit; and when the voltage to ground of the output end of the DC-DC converter is less than a preset output voltage range, determining that an insulation fault occurs on the corresponding direct current branch circuit.

The voltage to ground of the output end of the DC-DC converter of the corresponding direct current branch circuit is detected by using the output voltage detection apparatus. The voltage to ground of the output end may include a voltage to ground of a positive output end and a voltage to ground of a negative output end. The output voltage detection apparatus may further send a detection result to the controller.

When an insulation fault occurs at the output end of the DC-DC converter, the voltage to ground of the output end decreases. Therefore, the preset output voltage range that is of the direct current branch circuit and that is obtained when no insulation fault occurs on the direct current branch circuit may be determined in advance. The preset output voltage range may include a preset output voltage range corresponding to the positive output end and a preset output voltage range corresponding to the negative output end.

The controller compares, with the preset output voltage range corresponding to the positive output end, the voltage to ground that is of the positive output end and that is detected by the output voltage detection apparatus and compares the voltage to ground of the negative output end with the preset output voltage range corresponding to the negative output end. When determining that the voltage to ground of the output end of the DC-DC converter is less than the preset output voltage range, the controller determines that the insulation fault occurs on the corresponding direct current branch circuit. In this case, the controller may perform comparison verification on the determining conclusion and the determining conclusion obtained by using the leakage current of the direct current branch circuit in S202, to improve insulation fault detection accuracy. Therefore, erroneous determining of the controller can be effectively avoided, so that an insulation fault can be effectively isolated.

Further, when each direct current branch circuit of the photovoltaic power generation system further includes a breaking apparatus, the method further includes the following step:

when determining that an insulation fault occurs on the direct current branch circuit, controlling the breaking apparatus on the direct current branch circuit on which the insulation fault occurs to be disconnected, so that the faulty branch circuit is broken, to isolate the insulation fault.

Method Embodiment 2

An embodiment further provides a method for diagnosing an insulation fault of a photovoltaic power generation system. The method can be applied to a photovoltaic power generation system in which a direct current branch circuit does not include a leakage current detection apparatus. This is described in the following with reference to the accompanying drawings.

Figure 11:
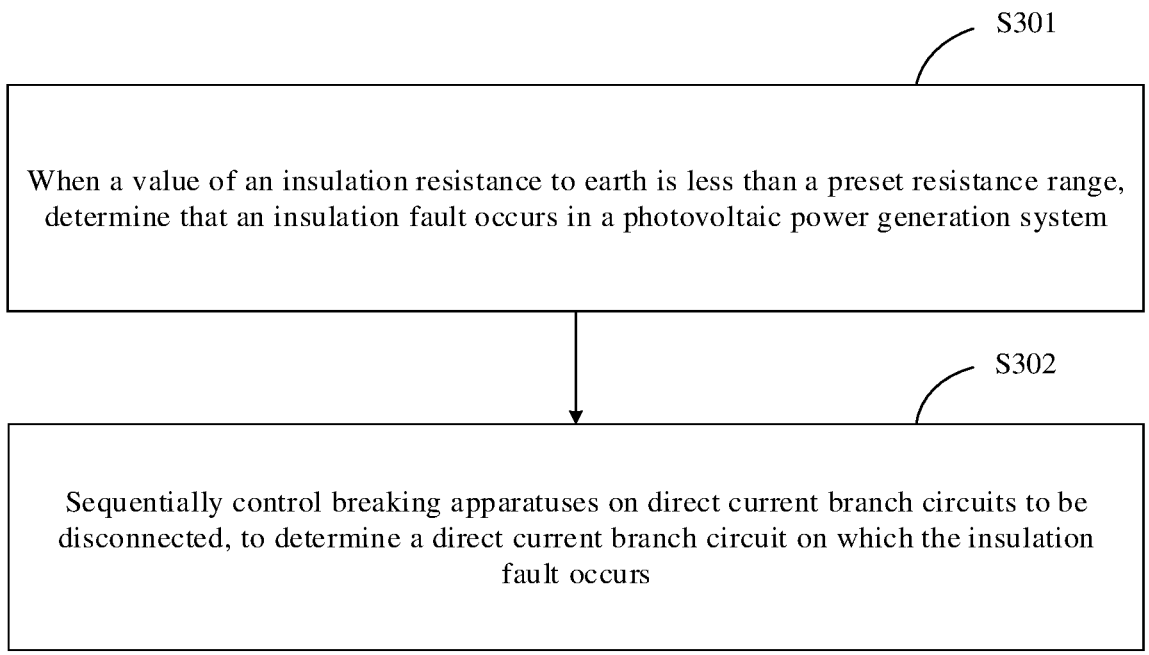
FIG. 11 is a flowchart of another method for diagnosing an insulation fault of a photovoltaic power generation system according to an embodiment.

FIG. 11 is a flowchart of another method for diagnosing an insulation fault of a photovoltaic power generation system according to an embodiment.

The photovoltaic power generation system includes an insulation resistance detection apparatus, an inverter, a controller, and at least two direct current branch circuits.

Each direct current branch circuit includes a DC-DC converter and a breaking apparatus.

An input end of the DC-DC converter is connected to a corresponding photovoltaic unit, and an output end of the DC-DC converter is connected to an input end of the inverter.

The DC-DC converter is configured to: perform direct current-direct current conversion on a direct current that is output by the corresponding photovoltaic unit, and then transmit a converted direct current to the inverter.

The inverter is configured to invert the direct current transmitted by the DC-DC converter into an alternating current.

The insulation resistance detection apparatus is configured to: before the photovoltaic power generation system runs, detect a value of an insulation resistance to ground of the photovoltaic power generation system, and send a detection result to the controller.

For descriptions of the photovoltaic power generation system, refer to System Embodiment 5. Details are not described herein again in this embodiment.

The method in this embodiment may be implemented by a controller. The method provided in this embodiment includes the following steps:

S301. When the value of the insulation resistance to ground is less than a preset resistance range, determine that an insulation fault occurs in the photovoltaic power generation system.

When no insulation fault occurs in the photovoltaic power generation system, the photovoltaic power generation system is insulated from ground. When an insulation fault occurs in the photovoltaic power generation system, a value of an insulation resistance to ground of the photovoltaic power generation system decreases. Therefore, the preset resistance range that is of the photovoltaic power generation system and that is obtained when no insulation fault occurs in the photovoltaic power generation system may be determined in advance. Before the photovoltaic power generation system runs, the insulation resistance detection apparatus is used to detect the value of the insulation resistance to ground of the photovoltaic power generation system and send the value of the insulation resistance to ground to the controller.

The controller can determine, when the value of the insulation resistance to ground is less than the preset resistance range, that the insulation fault occurs in the photovoltaic power generation system.

S302. Sequentially control breaking apparatuses on the direct current branch circuits to be disconnected, to determine a direct current branch circuit on which the insulation fault occurs.

When a breaking apparatus breaks the direct current branch circuit on which the insulation fault occurs, it is equivalent that insulation fault isolation is implemented. After the photovoltaic power generation system isolates the insulation fault, the photovoltaic power generation system recovers to be insulated from ground. Therefore, if the breaking apparatus breaks the direct current branch circuit on which the insulation fault occurs, a detection result of the insulation resistance detection apparatus recovers to be in the preset resistance range. The controller may sequentially control the breaking apparatuses on the direct current branch circuits to be disconnected, and further determine, based on a detection result that is of the insulation resistance detection apparatus and that is obtained after the breaking apparatus is disconnected, the direct current branch circuit on which the insulation fault occurs.

In conclusion, according to the method for diagnosing an insulation fault of a photovoltaic power generation system provided in this embodiment, before the photovoltaic power generation system runs, the value of the insulation resistance to ground of the photovoltaic power generation system is detected by using the insulation resistance detection apparatus, so that it can be first determined whether an insulation fault occurs in the entire photovoltaic power generation system. When determining that an insulation fault occurs in the photovoltaic power generation system, the controller can sequentially control the breaking apparatuses on the direct current branch circuits to be disconnected, to determine a direct current branch circuit on which the insulation fault occurs, so that insulation fault isolation can be performed in time on the direct current branch circuit on which the insulation fault occurs, to eliminate a potential safety hazard.

It should be understood that "at least one (item)" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

The foregoing descriptions are merely embodiments, but are not intended as limiting. By using the method and the content of the embodiments, any persons of ordinary skill in the art can make a plurality of possible changes and modifications on the solutions, or amend the solutions thereof to be embodiments with equal effects through equivalent variations without departing from the scope of the embodiments. Therefore, any simple changes, equivalent variations, and modifications made on the above embodiments without departing from the content of the solutions shall fall within the scope of the embodiments.

What is claimed is:

1. A photovoltaic power generation system, comprising:
an inverter;
a controller; and
at least two direct current branch circuits, wherein each direct current branch circuit comprises a DC-DC converter and a leakage current detection apparatus, an input end of the DC-DC converter is connected to a corresponding photovoltaic unit, and an output end of the DC-DC converter is connected to an input end of the inverter;
wherein the DC-DC converter is configured to perform direct current to direct current conversion on a direct current that is output by the corresponding photovoltaic unit, and then transmit a converted direct current to the inverter;
wherein the inverter is configured to invert the direct current transmitted by the DC-DC converter into an alternating current;
wherein the leakage current detection apparatus is configured to: detect a leakage current of a direct current branch circuit on which the leakage current detection apparatus is located, and send the leakage current to the controller,
wherein the controller is configured to: before the photovoltaic power generation system runs, obtain values and directions of leakage currents of the at least two direct current branch circuits, and detect, based on the values and the directions of leakage currents of each of the at least two direct current branch circuits, a direct current branch circuit in the at least two direct current branch circuits on which an insulation fault occurs, and the controller is further configured to: when the photovoltaic power generation system runs and a value of a leakage current of a particular direct current branch circuit exceeds a preset range, detect that an insulation fault occurs on the particular direct current branch circuit.

2. The photovoltaic power generation system according to claim 1, further comprising:
an insulation resistance detection apparatus, wherein the insulation resistance detection apparatus is configured to: before the photovoltaic power generation system runs, detect a value of an insulation resistance to ground of the photovoltaic power generation system, and send the value of the insulation resistance to ground to the controller, and the controller is configured to:
when the value of the insulation resistance to ground is less than a preset resistance range, detect that an insulation fault occurs in the photovoltaic power generation system.

3. The photovoltaic power generation system according to claim 1, wherein each direct current branch circuit further comprises:
an input voltage detection apparatus configured to detect a voltage to ground of the input end of the DC-DC converter of the corresponding direct current branch circuit, and the controller is configured to: when the voltage to ground of the input end of the DC-DC converter is less than a preset input voltage range, detect that an insulation fault occurs on the corresponding direct current branch circuit.

4. The photovoltaic power generation system according to claim 1, wherein each direct current branch circuit further comprises:
an output voltage detection apparatus configured to detect a voltage to ground of the output end of the DC-DC converter of the corresponding direct current branch circuit; and the controller is configured to: when the voltage to ground of the output end of the DC-DC converter is less than a preset output voltage range, detect that an insulation fault occurs on the corresponding direct current branch circuit.

5. The photovoltaic power generation system according to claim 1, wherein each direct current branch circuit further comprises:
a breaking apparatus, and the controller is further configured to: when determining that an insulation fault occurs on the direct current branch circuit, control the breaking apparatus on the direct current branch circuit on which the insulation fault occurs to be disconnected, to isolate the insulation fault.

6. The photovoltaic power generation system according to claim 5, wherein the controller is further configured to: after controlling the breaking apparatus on the direct current branch circuit on which the insulation fault occurs to be disconnected, control the DC-DC converter on the direct current branch circuit on which the insulation fault occurs to be powered off.

7. The photovoltaic power generation system according to claim 5, wherein the breaking apparatus of each direct current branch circuit is integrated into the DC-DC converter, or the breaking apparatus of each direct current branch circuit is integrated into the inverter.

8. The photovoltaic power generation system according to claim 1, wherein the leakage current detection apparatus of each direct current branch circuit is integrated into the corresponding DC-DC converter, or the leakage current detection apparatus of each direct current branch circuit is integrated into the inverter.

9. A photovoltaic power generation system, comprising
an insulation resistance detection apparatus,
an inverter,
a controller, and
at least two direct current branch circuits, wherein each direct current branch circuit comprises a DC-DC converter and a breaking apparatus, an input end of the DC-DC converter is connected to a corresponding photovoltaic unit, an output end of the DC-DC converter is connected to an input end of the inverter, the DC-DC converter is configured to: perform direct current-direct current conversion on a direct current that is output by the corresponding photovoltaic unit, and then transmit a converted direct current to the inverter, the inverter is configured to invert the direct current transmitted by the DC-DC converter into an alternating current; the insulation resistance detection apparatus and the controller are configured to: when a value of the insulation resistance to ground of the photovoltaic power generation system is less than a preset resistance range, detect an insulation fault in the photovoltaic power generation system, and sequentially control breaking apparatuses on the at least two direct current branch circuits to be disconnected.

10. The photovoltaic power generation system according to claim 5, wherein the insulation resistance detection apparatus is configured to: before the photovoltaic power generation system runs, detect a value of an insulation resistance to ground of the photovoltaic power generation system, and send the value of the insulation resistance to ground to the controller.

11. A method for diagnosing an insulation fault of a photovoltaic power generation system, wherein the photovoltaic power generation system comprises an inverter and at least two direct current branch circuits, each direct current branch circuit comprises a DC-DC converter and a leakage current detection apparatus, an input end of the DC-DC converter is connected to a corresponding photovoltaic unit, and an output end of the DC-DC converter is connected to an input end of the inverter, and the method comprises, for each of the at least two direct current branch circuits:
   controlling the DC-DC converter of a respective direct current branch circuit to perform direct current to direct current conversion on a direct current that is output by the corresponding photovoltaic unit of the respective direct current branch circuit;
   transmitting the converted direct current to the inverter of the respective direct current branch circuit;
   controlling the inverter to invert the direct current transmitted by the DC-DC converter into an alternating current;
   receiving a leakage current that is of the respective direct current branch circuit on which the leakage current detection apparatus is located and that is detected by the leakage current detection apparatus; and,
   when the photovoltaic power generation system runs and a value of a leakage current of the particular direct current branch circuit exceeds a preset range,
   detecting an insulation fault on the particular direct current branch circuit, comprising identifying that the leakage current of the particular direct current branch circuit exceeds the preset range and identifying that a cause of a deviation of the leakage current of the particular direct current branch circuit from the preset range is the insulation fault.

12. The method according to claim 11, wherein before the photovoltaic power generation system runs, detecting, based on values and directions of leakage currents of the at least two direct current branch circuits, a direct current branch circuit on which an insulation fault occurs.

13. The method according to claim 12, wherein before the determining, based on values and directions of leakage currents of the direct current branch circuits, a direct current branch circuit on which an insulation fault occurs, the method further comprises:
   obtaining a value of an insulation resistance to ground of the photovoltaic power generation system; and, when the value of the insulation resistance to ground is less than a preset resistance range,
   determining that the insulation fault occurs in the photovoltaic power generation system.

14. The method according to claim 11, further comprising:
   obtaining a voltage to ground of the input end of the DC-DC converter of the corresponding direct current branch circuit; and, when the voltage to ground of the input end of the DC-DC converter is less than a preset input voltage range,
   determining that an insulation fault occurs on the corresponding direct current branch circuit.

15. The method according to claim 11, further comprising:
   obtaining a voltage to ground of the output end of the DC-DC converter of the corresponding direct current branch circuit; and, when the voltage to ground of the output end of the DC-DC converter is less than a preset output voltage range,
   determining that an insulation fault occurs on the corresponding direct current branch circuit.

16. The method according to claim 11, wherein each direct current branch circuit comprises a breaking apparatus; and the method further comprises, when determining that an insulation fault occurs on the direct current branch circuit:
   controlling the breaking apparatus on the direct current branch circuit on which the insulation fault occurs to be disconnected, to isolate the insulation fault.

17. The method according to claim 16, further comprising, after controlling the breaking apparatus on the direct current branch circuit on which the insulation fault occurs to be disconnected:
   controlling the DC-DC converter on the direct current branch circuit on which the insulation fault occurs to be powered off.

* * * * *